(12) United States Patent
Kasuya et al.

(10) Patent No.: US 12,083,845 B2
(45) Date of Patent: Sep. 10, 2024

(54) SUSPENSION CONTROL APPARATUS

(71) Applicant: HITACHI AUTOMOTIVE SYSTEMS, LTD., Hitachinaka (JP)

(72) Inventors: Kentaro Kasuya, Utsunomiya (JP); Nobuyuki Ichimaru, Yokohama (JP); Ryusuke Hirao, Kamagaya (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 1016 days.

(21) Appl. No.: 16/982,219

(22) PCT Filed: Sep. 21, 2018

(86) PCT No.: PCT/JP2018/034983
§ 371 (c)(1),
(2) Date: Sep. 18, 2020

(87) PCT Pub. No.: WO2019/187223
PCT Pub. Date: Oct. 3, 2019

(65) Prior Publication Data
US 2021/0023904 A1     Jan. 28, 2021

(30) Foreign Application Priority Data

Mar. 27, 2018    (JP) .................................. 2018-060017

(51) Int. Cl.
*B60G 17/0165* (2006.01)
*B60G 17/019* (2006.01)

(52) U.S. Cl.
CPC ....... *B60G 17/0165* (2013.01); *B60G 17/019* (2013.01); *B60G 2202/312* (2013.01);
(Continued)

(58) Field of Classification Search
CPC .............. B60G 17/016; B60G 17/0165; B60G 17/019; B60G 17/06; B60G 2202/312;
(Continued)

(56) References Cited

U.S. PATENT DOCUMENTS

| | | | |
|---|---|---|---|
| 2008/0228352 A1* | 9/2008 | Brookes ............... | B60G 17/019 280/5.514 |
| 2010/0125389 A1* | 5/2010 | Talty .................... | B60G 17/018 701/37 |

(Continued)

FOREIGN PATENT DOCUMENTS

| | | |
|---|---|---|
| CN | 104553666 | 4/2015 |
| DE | 10 2016 216 008 | 3/2018 |

(Continued)

OTHER PUBLICATIONS

Office Action dated Oct. 11, 2021 in counterpart DE Application No. 11 2018 007 347.5 with English translation.
(Continued)

*Primary Examiner* — Matthew J. Reda
(74) *Attorney, Agent, or Firm* — Wenderoth, Lind & Ponack, L.L.P.

(57) ABSTRACT

A suspension control apparatus includes a control device configured to control a damping characteristic of each of damping force adjustable shock absorbers. The control device includes an external force calculation portion configured to calculate a total external force working on a vehicle body based on a physical amount output from a physical amount extraction portion, an operation force calculation portion configured to calculate an operation-derived force applied to each of the damping force adjustable shock absorbers according to a load movement due to an operation on the vehicle, and a vehicle behavior extraction portion configured to determine an external force derived from a road surface input by separating the operation-derived force
(Continued)

calculated by the operation force calculation portion from the total external force calculated by the external force calculation portion.

4 Claims, 14 Drawing Sheets

(52) U.S. Cl.
CPC .... *B60G 2204/62* (2013.01); *B60G 2400/102* (2013.01); *B60G 2400/202* (2013.01); *B60G 2400/252* (2013.01); *B60G 2400/60* (2013.01); *B60G 2400/82* (2013.01); *B60G 2500/104* (2013.01)

(58) Field of Classification Search
CPC .......... B60G 2204/62; B60G 2400/102; B60G 2400/202; B60G 2400/252; B60G 2400/60; B60G 2400/82; B60G 2500/104
See application file for complete search history.

(56) References Cited

U.S. PATENT DOCUMENTS

| | | | |
|---|---|---|---|
| 2015/0088379 A1* | 3/2015 | Hirao | B60G 17/016 701/37 |
| 2015/0183289 A1 | 7/2015 | Koumura | |
| 2016/0318364 A1 | 11/2016 | Kanda et al. | |
| 2019/0168563 A1 | 6/2019 | Bärecke et al. | |

FOREIGN PATENT DOCUMENTS

| | | |
|---|---|---|
| JP | 5-38922 | 2/1993 |
| JP | 6-344743 | 12/1994 |
| JP | 8-200430 | 8/1996 |
| JP | 2000-103218 | 4/2000 |
| JP | 2008-260439 | 10/2008 |
| JP | 2015-123895 | 7/2015 |
| JP | 2016-203920 | 12/2016 |
| JP | 2017-109676 | 6/2017 |

OTHER PUBLICATIONS

International Search Report dated Nov. 27, 2018 in International (PCT) Application No. PCT/JP2018/034983 with English-language translation.

International Preliminary Report on Patentability and Written Opinion of The International Searching Authority dated Nov. 27, 2018 in International (PCT) Application No. PCT/JP2018/034983 with English-language translation.

Office Action dated Feb. 27, 2023 in corresponding Chinese Application No. 201880091238.6, with English language machine translation.

* cited by examiner

SUSPENSION CONTROL APPARATUS

TECHNICAL FIELD

The present invention relates to a suspension control apparatus mounted on a vehicle, such as an automobile, and configured to control a vibration of the vehicle.

BACKGROUND ART

Generally, as a suspension control apparatus mounted on a vehicle, such as an automobile, there is known an apparatus provided with a damping force adjustable shock absorber capable of adjusting a damping force between a vehicle body and each axle and configured to variably control a damping force characteristic exerted by this shock absorber based on a detection signal from a vehicle height sensor (for example, refer to PTL 1).

CITATION LIST

Patent Literature

[PTL 1] Japanese Patent Application Public Disclosure No. 5-38922

SUMMARY OF INVENTION

Technical Problem

Then, the conventional technique discussed in PTL 1 is disclosed as a configuration that estimates a sprung state based on information from the vehicle height sensor and a vehicle CAN signal. However, a sprung state amount in this case is estimated as a value containing a mixture of a sprung displacement generated due to a driver's operation (steering and/or braking) and a relative displacement generated due to a road surface input. This may lead to a reduction in the accuracy of estimating the sprung state amount.

One of objects of the present invention is to provide a suspension control apparatus capable of separating the relative displacement due to the road surface input and the relative displacement due to the driver's vehicle operation, thereby allowing it to improve accuracy of estimating a sprung speed, which is highly contributive to control of ride comfort.

Solution to Problem

According to one aspect of the present invention, a suspension control apparatus is provided. This suspension control apparatus includes damping force adjustable shock absorbers disposed between a vehicle body and individual wheels of a vehicle, respectively, and each having a damping characteristic that changes according to an instruction from an outside, a physical amount extraction portion configured to detect or estimate a physical amount based on a relative displacement between the vehicle body and each of the wheels, and a control device configured to control the damping characteristic of each of the damping force adjustable shock absorbers. The control device includes an external force calculation portion configured to calculate a total external force working on the vehicle body based on the physical amount output from the physical amount extraction portion, an operation force calculation portion configured to calculate an operation-derived force applied to each of the damping force adjustable shock absorbers according to a load movement due to an operation on the vehicle, and a vehicle behavior extraction portion configured to determine an external force derived from a road surface input by separating the operation-derived force calculated by the operation force calculation portion from the total external force calculated by the external force calculation portion.

According to the one aspect of the present invention, the suspension control apparatus can determine the external force derived from the road surface input by separating the operation-derived force calculated by the operation force calculation portion from the total external force calculated by the external force calculation portion. In other words, the suspension control apparatus can separate the relative displacement due to the road surface input and the relative displacement derived from the driver's operation by subtracting a relative displacement generated due to an inertial force derived from the driver's operation from the estimated relative displacement (the physical amount) between the vehicle body and each of the wheels that is detected by the physical amount extraction portion such as the vehicle height sensor. As a result, the suspension control apparatus can improve the accuracy of estimating the sprung speed, which is highly contributive to the control of the ride comfort.

DESCRIPTION OF EMBODIMENTS

Figure 1:
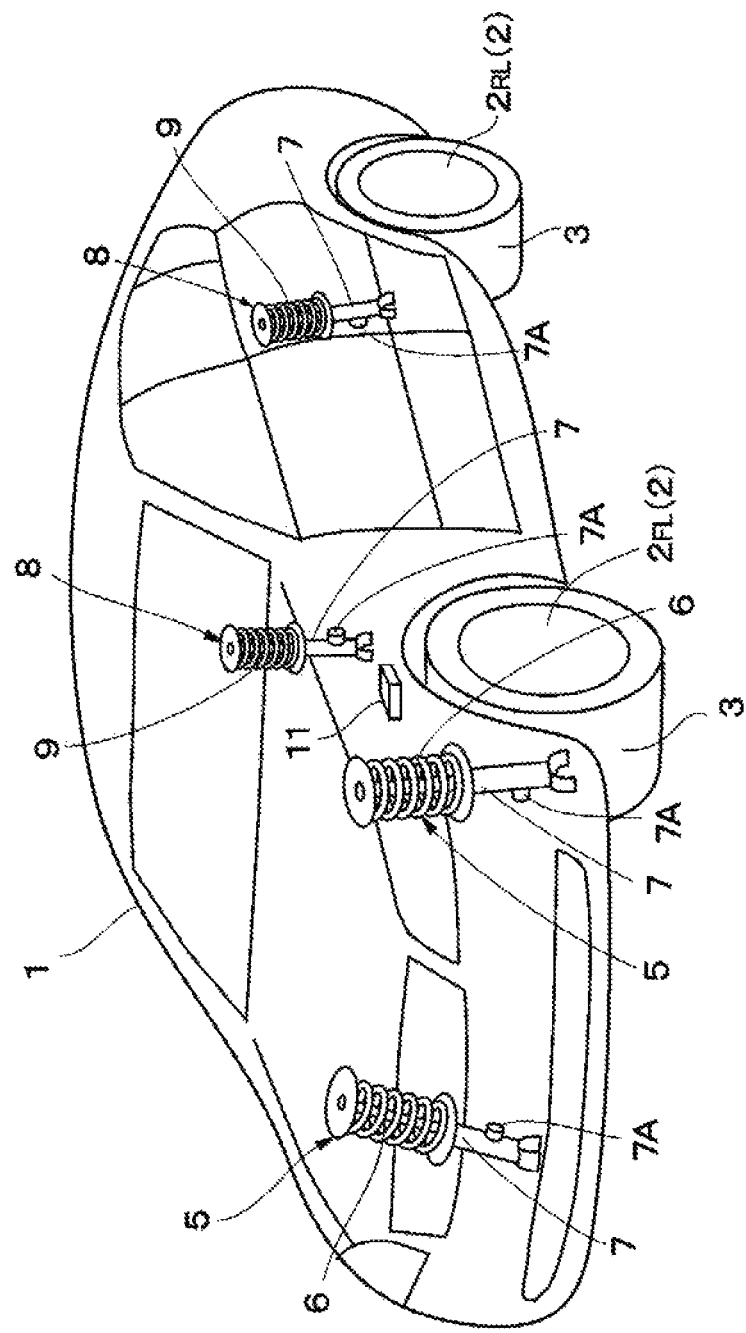
FIG. 1 is a perspective view illustrating an automobile to which a suspension control apparatus according to a first embodiment is applied.

In the following description, a suspension control apparatus according to embodiments of the present invention will be described in detail with reference to the accompanying drawings based on an example in which the suspension control apparatus is applied to a four-wheeled automobile.

For avoiding the complication of the description, the suspension control apparatus will be described, adding indexes indicating front left (FL), front right (FR), rear left (RL), and rear right (RR) to the reference numerals when focusing on, for example, the respective positions of wheels of the vehicle. When front left, front right, rear left, and rear right are collectively referred to, they will be described with the indexes removed from the reference numerals. Similarly, the suspension control apparatus will be described, adding indexes indicating front (F) and rear (R) to the reference numerals. When front and rear are collectively referred to, they will be described with the indexes removed from the reference numerals.

In FIG. 1, a vehicle body 1 forms a main structure of the vehicle (the automobile). A front left wheel 2FL, a front right wheel 2FR, a rear left wheel 2RL, and a rear right wheel 2RR (hereinafter collectively referred to as wheels 2) are provided below the vehicle body 1, as illustrated in, for example, FIG. 2. The wheels 2 include tires 3. The tires 3 function as springs that absorb, for example, fine roughness of a road surface.

Figure 2:
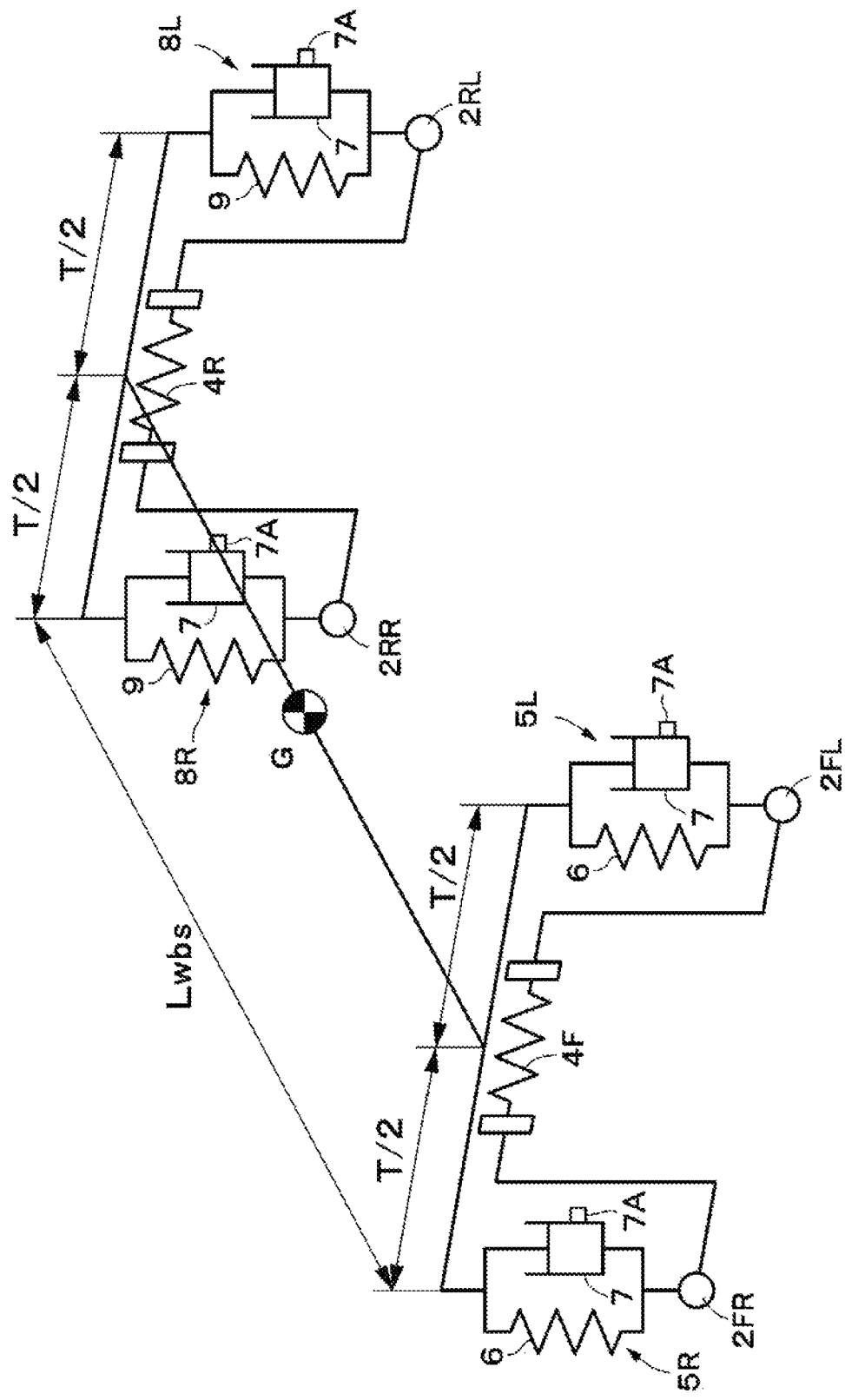
FIG. 2 illustrates a vehicle model used to design a state estimation portion in the automobile illustrated in FIG. 1.

As illustrated in FIG. 2, a stabilizer 4F is provided between the front left wheel 2FL and the front right wheel 2FR to, for example, suppress a roll of the vehicle body 1. A stabilizer 4R is also similarly provided between the rear left wheel 2RL and the rear right wheel 2RR. These stabilizers 4 are stabilizer mechanisms provided on the vehicle. The stabilizers 4 are each mounted on the vehicle body 1 via, for example, a pair of mounting bushes laterally spaced apart from each other. The stabilizer 4F on the front side generates a stabilizer reaction force based on torsional stiffness due to generation of a roll or a difference in vertical motion between the front left wheel 2FL and the front right wheel 2FR. Similarly, the stabilizer 4R on the rear side functions to generate a stabilizer reaction force based on torsional stiffness due to generation of a roll or a difference in vertical motion between the rear left wheel 2RL and the rear right wheel 2RR.

Suspension apparatuses 5 on the front wheel side are disposed between the vehicle body 1 and the wheels 2 (the front left wheel 2FL and the front right wheel 2FR). As illustrated in FIGS. 1 and 2, the suspension apparatuses 5 each include a coil spring 6 as a suspension spring, and a damping force adjustable damper (hereinafter referred to as a damper 7) as a damping force adjustable shock absorber disposed between the vehicle body 1 and each of the two wheels (the front left wheel 2FL and the front right wheel 2FR) in parallel with this coil spring 6. Suspension apparatuses 8 on the rear wheel side are disposed between the vehicle body 1 and the wheels 2 (the rear left wheel 2RL and the rear right wheel 2RR). The suspension apparatuses 8 each include a coil spring 9 as a suspension spring, and the damper 7 disposed between the vehicle body 1 and each of the wheels 2 (the rear left wheel 2RL and the rear right wheel 2RR) in parallel with this coil spring 9.

The suspension apparatuses 5 and 8 on the front and rear wheel sides may be configured to use, for example, air springs (not illustrated) of air suspensions instead of the coil springs 6 and 9 as the suspension springs. In this case, a vehicle height, which is the distance between the wheel 2 and the vehicle body 1, can be adjusted by supplying or discharging hydraulic fluid (compressed air) to or from each of the air springs on the front left wheel 2FL, front right wheel 2FR, rear left wheel 2RL, and rear right wheel 2RR sides.

Now, the damper 7 of each of the suspension apparatuses 5 and 8 on the front and rear wheel sides is constructed with use of a damping force adjustable hydraulic shock absorber, such as a semi-active damper. This damper 7 is equipped with an actuator 7A embodied by a damping force adjustment valve or the like for adjusting the characteristic of the generated damping force (a damping force characteristic) from a hard characteristic (a high characteristic) to a soft characteristic (a low characteristic). The actuator 7A is driven by an instruction from the outside and the flow of the hydraulic fluid is variably controlled, by which the damping characteristic of each of the dampers 7 is changed. More specifically, the damping force characteristic (i.e., the damping characteristic) of the damper 7 is adjusted according to a relative speed between the vehicle body 1 and the wheel 2 and a target damping coefficient (a corrected damping coefficient). In other words, a controller 11 outputs an instruction current i (refer to FIG. 3) according to the relative speed and the target damping coefficient. The damper 7 generates a damping force according to the instruction current i output from the controller 11.

Four vehicle height sensors 10 in total are provided on the individual wheel (the front left wheel 2FL, the front right wheel 2FR, the rear left wheel 2RL, and the rear right wheel 2RR) sides of the vehicle body 1. These vehicle height sensors 10 are vehicle height detection devices, and individually detect vehicle heights according to extension or compression of the suspension apparatuses 5 and 8 as the respective vehicle heights on the wheel 2 sides. The four vehicle height sensors 10 in total output detection signals indicating the respective vehicle heights to the controller 11. These vehicle height sensors 10 form a physical amount extraction portion that detects or estimates a physical amount based on a relative displacement between the vehicle body 1 and each of the wheels 2 (i.e., a vertical force and/or a vertical position). However, for example, an acceleration sensor that generally acquires the relative displacement is not included in the physical amount extraction portion. As a specific example of the physical amount extraction portion, for example, a load sensor on each of the wheel sides may be employed besides the vehicle height sensor. Besides them, a system configuration using a laser sensor can also be employed as long as this system can calculate the relative displacement.

The controller 11 includes a microcomputer and the like, and forms a control device that controls the damping characteristic of the damper 7. An input side of the controller 11 is connected to the vehicle height sensors 10, and is also connected to a CAN 12 (a Controller Area Network) to which various kinds of vehicle information represented by an acceleration/deceleration, a vehicle speed, and a steering angle of the vehicle are transmitted. The controller 11 can acquire the information such as the acceleration/deceleration, the vehicle speed, and the steering angle of the vehicle via the CAN 12. Further, an output side of the controller 11 is connected to each of the actuators 7A of the dampers 7. The controller 11 estimates a sprung speed of the vehicle body 1 based on the information such as the above-described vehicle height, acceleration/deceleration, vehicle speed, and steering angle. The controller 11 calculates the damping characteristic that the damper 7 should generate based on the estimated sprung speed. The controller 11 outputs the instruction current i according to the damping characteristic determined as a result of the calculation to the actuator 7A, thereby controlling the damping characteristic of the damper 7.

Figure 3:
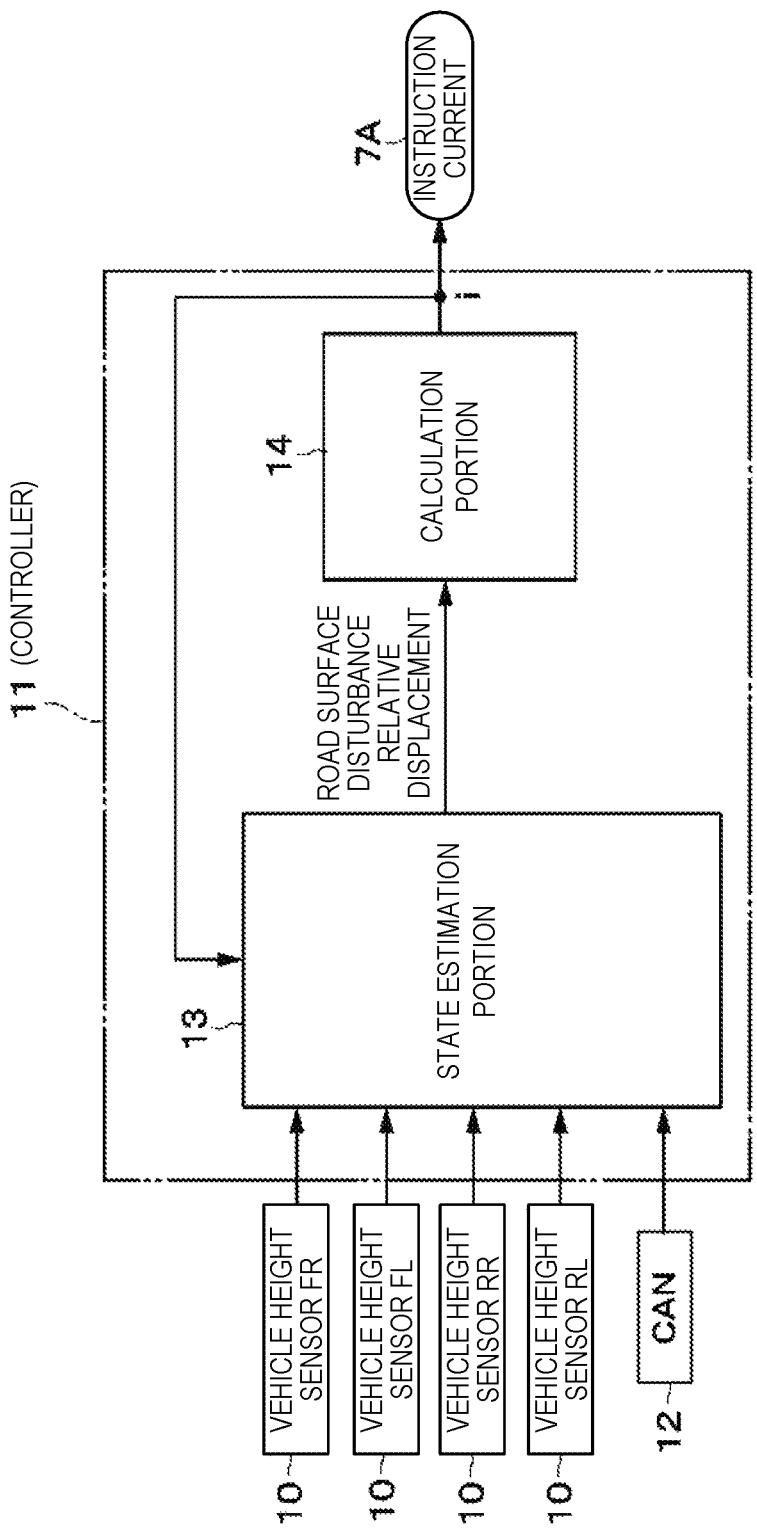
FIG. 3 is a control block diagram of a controller that controls ride comfort on the automobile illustrated in FIG. 1.

As illustrated in FIG. 3, the controller 11 includes a state estimation portion 13 and a calculation portion 14. The state estimation portion 13 estimates the state of the vehicle. The calculation portion 14 determines the damping characteristic (i.e., the instruction current i) based on a result of the estimation by the state estimation portion 13. This calculation portion 14 estimates the above-described sprung speed based on a road surface disturbance relative speed, which will be described below, as a result of the estimation by the state estimation portion 13, and determines the damping force characteristic that the damper 7 should generate based on the estimated sprung speed. Further, the calculation portion 14 of the controller 11 outputs the instruction current i according to the above-described damping characteristic to the actuator 7A, thereby variably controlling the damping characteristic of the damper 7.

Figure 4:
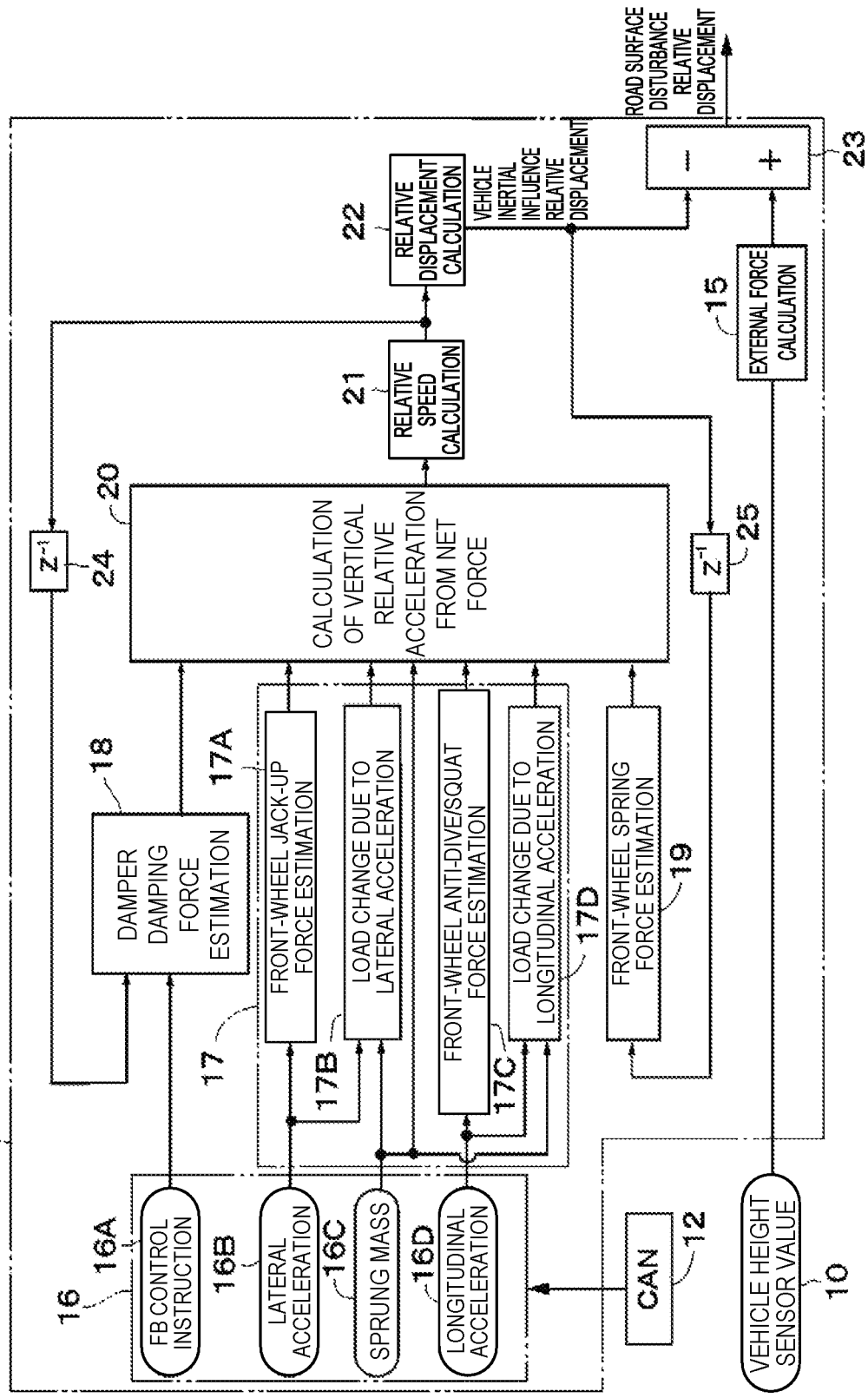
FIG. 4 is a control block diagram specifically illustrating the state estimation portion illustrated in FIG. 3.

As illustrated in FIG. 4, the state estimation portion 13 of the controller 11 includes an external force calculation portion 15, a signal processing portion 16, a vertical force calculation portion 17, a damper damping force estimation portion 18, a front-wheel spring force estimation portion 19, and a vertical relative acceleration calculation portion 20, and further includes a relative speed calculation portion 21, a relative displacement calculation portion 22, and a vehicle behavior extraction portion 23. The external force calculation portion 15 serves as an external force calculation portion that calculates a total external force (including, for example, a road surface input and an input derived from a driver) working on the vehicle body 1 based on the vehicle height sensor value output from each of the vehicle height sensors 10 (i.e., the physical amount acquired by the physical amount extraction portion) and the CAN information. The signal processing portion 16 processes a signal from the CAN 12. The vertical force calculation portion 17 serves as a vertical force calculation portion that calculates the vertical force on the vehicle body 1. The vertical relative acceleration calculation portion 20 calculates a vertical relative acceleration derived from the driver's input based on a net force (total force) of forces generated on the sprung side due to the driver's input. The vehicle behavior extraction portion 23 serves as a road surface disturbance relative displacement calculation portion. In a case where the vehicle height sensor value is used as the physical amount of the physical amount extraction portion, a total vehicle height value including an amount corresponding to a vehicle height change due to the total external force is acquired as the value output from the external force calculation portion 15.

The above-described signal processing portion 16 includes an FB control instruction portion 16A, a lateral acceleration calculation portion 16B, a sprung mass calculation portion 16C, and a longitudinal acceleration calculation portion 16D. The FB control instruction portion 16A outputs an FB (feedback) control instruction based on a signal from an actual instruction value measured by the CAN 12 or the controller 11. The lateral acceleration calculation portion 16B calculates a lateral acceleration Ay working on the vehicle based on a signal from the CAN 12 (for example, the steering angle signal and the vehicle speed signal of the vehicle).

Then, the longitudinal acceleration calculation portion 16D functions to calculate a longitudinal acceleration Ax working on the vehicle based on a signal from the CAN 12 (for example, the acceleration signal and/or the deceleration signal of the vehicle). The above-described sprung mass calculation portion 16C functions to estimate the mass (a sprung mass M) of the vehicle body 1 according to a signal from the CAN 12. In this case, the sprung mass calculation portion 16C may be configured to use a predetermined value as the mass (the sprung mass M) of the vehicle body 1. The sprung mass calculation portion 16C may calculate the mass of the vehicle body 1 with use of the value of the vehicle height sensor (the vehicle height value).

The vertical force calculation portion 17 of the state estimation portion 13 includes, for example, a front-wheel jack-up force estimation portion 17A, a portion 17B for calculating a load change due to the lateral acceleration Ay, a front-wheel anti-dive/squat force estimation portion 17C, and a portion 17D for calculating a load change due to the longitudinal acceleration Ax. The vertical force calculation portion 17 forms the external force calculation portion together with the damper damping force estimation portion 18 and the front-wheel spring force estimation portion 19. This external force calculation portion functions to calculate an operation-derived force applied to the damper 7 (the damping force adjustable shock absorber) at each of the wheels according to a load movement due to an operation on the vehicle (including a driving operation by the driver and an autonomous driving operation without the intervention of the driver).

The front-wheel jack-up force estimation portion 17A determines jack-up/down forces JFFL, JFFR, JFRL, and JFRR by estimating and calculating them with use of equations 10 to 17, which will be described below, based on the lateral acceleration Ay calculated by the lateral acceleration calculation portion 16B. The portion 17B for calculating the load change due to the lateral acceleration Ay calculates a change in a load $\Delta W$ applied to each of the wheels 2 (i.e., wheel loads $\Delta WFL$, $\Delta WFR$, $\Delta WRL$, and $\Delta WRR$) with use of equations 3 to 7, which will be described below, based on the sprung mass M calculated by the sprung mass calculation portion 16C and the above-described lateral acceleration Ay.

The front-wheel anti-dive/squat force estimation portion 17C determines front-wheel anti-dive/squat forces GFFL, GFFR, GFRL, and GFRR with use of equations 22 to 29, which will be described below, based on the longitudinal acceleration Ax calculated by the longitudinal acceleration calculation portion 16D. The portion 17D for calculating the load change due to the longitudinal acceleration Ax calculates a change in a load $\Delta WAx$ generated at each of the wheels due to the longitudinal acceleration Ax with use of equations 18 and 19, which will be described below, based on the sprung mass M calculated by the sprung mass calculation portion 16C and the above-described longitudinal acceleration Ax.

The damper damping force estimation portion 18 of the state estimation portion 13 forms a damping characteristic determination portion that determines the damping characteristic of the damper 7 at each of the wheels based on an instruction from the FB control instruction portion 16A and a relative speed ($\Delta X21$offset/dt) as an estimated sprung speed calculated by the relative speed calculation portion 21

(a sprung speed estimation portion), which will be described below. In other words, the damper damping force estimation portion 18 determines a damper damping force Fda by estimating and calculating it as indicated by the following equation 2. In this equation, a coefficient c is a damping coefficient.

$$\Delta X_{21_{offset}}/dt = \Delta \dot{X}_{21_{offset}} \quad \text{[Equation 1]}$$

$$F_{da} = c\Delta \dot{X}_{21_{offset}} \quad \text{[Equation 2]}$$

The front-wheel spring force estimation portion 19 has a function of estimating and calculating a spring force Fsp working on the front wheel (the front left wheel 2FL and the front right wheel 2ER) based on a relative displacement ($\Delta X21$offset) calculated by the relative displacement calculation portion 22, which will be described below, as a front-wheel spring force (Fsp=k$\Delta X21$offset). The coefficient k is a spring constant. A delay operator 24 is provided between the damper damping force estimation portion 18 and the relative speed calculation portion 21. Further, another delay operator 25 is provided between the front-wheel spring force estimation portion 19 and the relative displacement calculation portion 22.

The vertical relative acceleration calculation portion 20 calculates a relative acceleration α by summing up the vertical force calculated by the vertical force calculation portion 17 (i.e., the jack-up/down force JFFL, JFFR, JFRL, or JFRR estimated by the front-wheel jack-up force estimation portion 17A, the change in the load ΔW applied to each of the wheels 2 that is calculated by the load change calculation portion 17B, the front-wheel anti-dive/squat force GFFL, GFFR, GFRL, or GFRR estimated by the front-wheel anti-dive/squat force estimation portion 17C, and the change in the load ΔWAx calculated by the load change calculation portion 17D), the damper damping force Fda according to the above-described equation 2 that is estimated by the damper damping force estimation portion 18, and the front-wheel spring force (Fsp=k$\Delta X21$offset) estimated by the front-wheel spring force estimation portion 19 as indicated by an equation 34, which will be described below, to thus calculate a net force Ma of the operation-derived forces while adding up the respective forces (ΔW, ΔWAx, JF, and GF), and dividing this net force Ma by the mass M.

$$M_\alpha = M\Delta \ddot{X}_{21_{offset}} \quad \text{[Equation 3]}$$

$$\alpha = \Delta \ddot{X}_{21_{offset}} \quad \text{[Equation 4]}$$

The relative speed calculation portion 21 illustrated in FIG. 4 calculates the relative speed ($\Delta X21$offset/dt) by integrating the relative acceleration α calculated by the relative acceleration calculation portion 20. The relative displacement calculation portion 22 calculates the relative displacement ($\Delta X21$offset) by integrating the relative speed ($\Delta X21$offset/dt) calculated by the relative speed calculation portion 21.

The vehicle behavior extraction portion 23 forms a vehicle behavior extraction portion that determines the external force derived from the road surface input by separating the above-described operation-derived force calculated by the above-described operation force calculation portion from the above-described total external force calculated by the external force calculation portion 15. In other words, the vehicle behavior extraction portion 23 functions to calculate a relative displacement due to a road surface disturbance (i.e., the road surface disturbance relative displacement) by subtracting the relative displacement ($\Delta X21$offset) due to the driver's operation from the sensor value acquired by the vehicle height sensor 10.

In other words, the state estimation portion 13 of the controller 11 (the control device) includes the vertical force calculation portion 17, the relative acceleration calculation portion 20, the relative speed calculation portion 21, and the damper damping force estimation portion 18 (the damping characteristic determination portion). The vertical force calculation portion 17 serves as the vertical force calculation portion that calculates the vertical force on the vehicle body 1. The relative acceleration calculation portion 20 serves as an acceleration calculation portion that calculates the acceleration α based on the vertical force calculated by the vertical force calculation portion 17. The relative speed calculation portion 21 serves as a sprung speed estimation portion that estimates the relative speed ($\Delta X21$offset/dt) as the sprung speed of the vehicle body 1 based on the acceleration α calculated by the relative acceleration calculation portion 20. The damper damping force estimation portion 18 estimates the damping characteristic of the damper 7 at each of the wheels based on the relative speed ($\Delta X21$offset/dt) calculated by the relative speed calculation portion 21 as the damper damping force Fda according to the above-described equation 2.

Among them, the vertical force calculation portion (for example, the front-wheel jack-up force estimation portion 17A, the portion 17B for calculating the load change due to the lateral acceleration Ay, the front-wheel anti-dive/squat force estimation portion 17C, and the portion 17D for calculating the load change due to the longitudinal acceleration Ax) forms the external force calculation portion that calculates the operation-derived force applied to the damper 7 (the damping force adjustable shock absorber) at each of the wheels according to the load movement due to the operation on the vehicle (including the driving operation by the driver and the autonomous driving operation force without the intervention of the driver) together with the damper damping force estimation portion 18 and the front-wheel spring force estimation portion 19.

Figure 5:
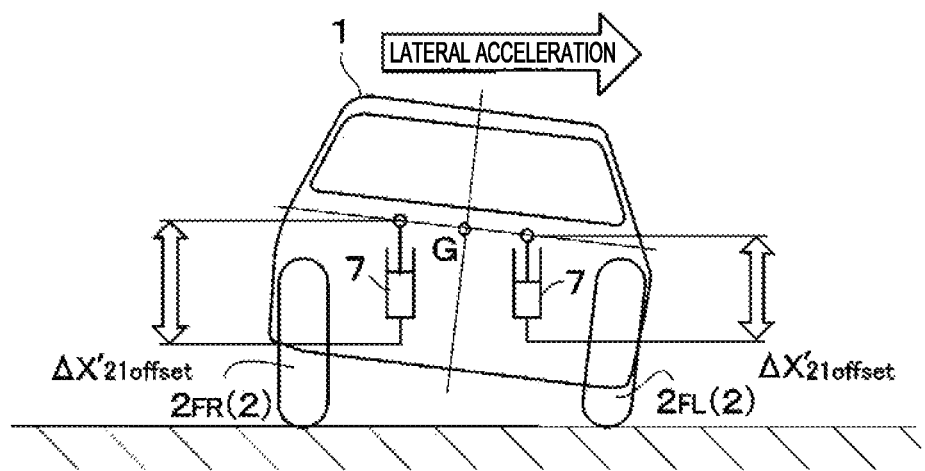
FIG. 5 illustrates a load movement on the automobile due to a lateral acceleration.
Figure 6:
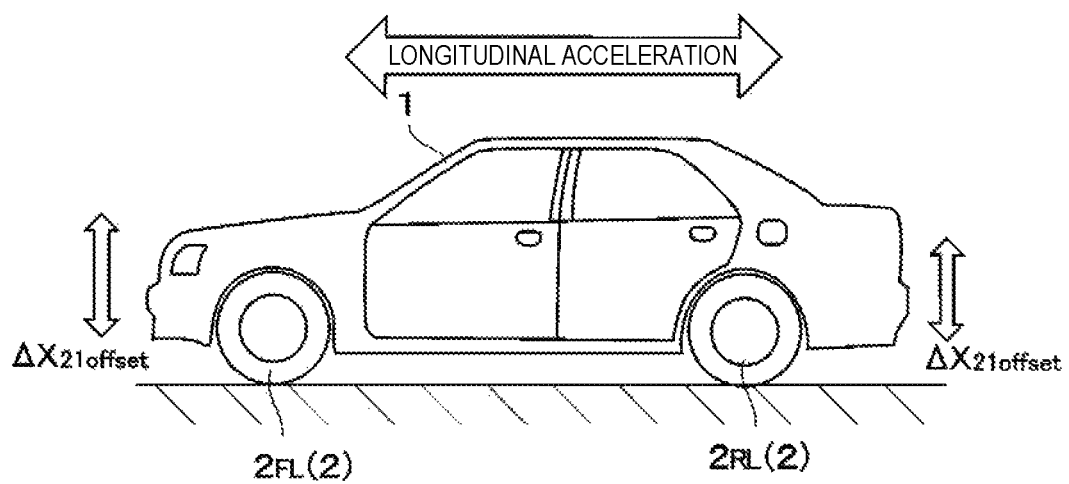
FIG. 6 illustrates a load movement on the automobile due to a longitudinal acceleration.

For example, the relative displacement generated due to the driver's operation while the vehicle is running is calculated based on the load movement and the jack-up/down force generated due to the lateral acceleration Ay as illustrated in FIG. 5 and the load movement and the lift-up/down force generated due to the longitudinal acceleration Ax as illustrated in FIG. 6. FIGS. 5 and 6 illustrate how the vehicle behaves under a situation that these forces are applied.

As illustrated in FIG. 5, relative displacements X21left and X21right for controlling the ride comfort are calculated by adding and subtracting ΔX21offset to and from the detection value (a relative displacement X21) of the vehicle height sensor 10 as indicated by the following equations 5 and 6, assuming that ΔX21'offset represents the relative displacement generated due to the lateral acceleration Ay between the vehicle body 1 and the wheel 2.

$$X_{21_{left}} = X_{21} + \Delta X'_{21_{offset}} \quad \text{[Equation 5]}$$

$$X_{21_{right}} = X_{21} + \Delta X'_{21_{offset}} \quad \text{[Equation 6]}$$

Next, the load ΔW applied to each of the wheels 2 (i.e., the wheel loads ΔWFL, ΔWFR, ΔWRL, and ΔWRR) can be calculated from the following equations 7 to 10, assuming that hg [m] represents the height of a sprung center of gravity G, Ay [m/s$^2$] represents the lateral acceleration, θroll [degrees] represents a roll angle generated due to the roll, M [kg] represents the sprung mass as the vehicle weight, and T [m] represents a vehicle width. A half width T/2 of the vehicle width T illustrated in FIG. 2 is a dimension corresponding to widths TFl, TFr, TRl, and TRr in the equations 7 to 10. In this case, the load ΔW may be calculated assuming that the roll angle θroll is zero (θroll=0) as indicated by the following equation 11 for the simplification of the calculation.

$$\Delta W_{FL} = \frac{-Ay2hg\cos\theta_{roll}M_{Fl}}{T_{Fl}} \quad \text{[Equation 7]}$$

$$\Delta W_{FR} = \frac{Ay2hg\cos\theta_{roll}M_{Fr}}{T_{Fr}} \quad \text{[Equation 8]}$$

$$\Delta W_{RL} = \frac{-Ay2hg\cos\theta_{roll}M_{Rl}}{T_{Rl}} \quad \text{[Equation 9]}$$

$$\Delta W_{RR} = \frac{Ay2hg\cos\theta_{roll}M_{Rr}}{T_{Rr}} \quad \text{[Equation 10]}$$

$$\cos\theta_{roll} \cong 1 \quad \text{[Equation 11]}$$

The change in the load ΔW at each of the wheels (i.e., the wheel loads ΔWFL, ΔWFR, ΔWRL, and ΔWRR) generated due to the lateral acceleration Ay calculated from the above-described equations 7 to 10 becomes equal to a value calculated by multiplying the relative acceleration ay by the sprung mass M at each of the wheels as indicated by the following equations 12 and 13, and therefore the relative acceleration ay can be calculated based on the load ΔW generated at each of the wheels and the relative displacement (ΔX21offset) is calculated by integrating this value.

$$\alpha y = \Delta \ddot{X}_{21_{offset}} \quad \text{[Equation 12]}$$

$$\Delta W = M \Delta \ddot{X}_{21_{offset}} \quad \text{[Equation 13]}$$

Further, the jack-up/down forces JFFL, JFFR, JFRL, and JFRR can be expressed by the following equations 14 to 17 when the lateral acceleration Ay is positive (Ay>0). In these equations, coefficients PCFl, NCFr, PCRl, and NCRr are proportional coefficients.

$$JF_{Fl} = PC_{Fl} \times Ay \quad \text{[Equation 14]}$$

$$JF_{FR} = -NC_{FR} \times Ay \quad \text{[Equation 15]}$$

$$JF_{RL} = PC_{Rl} \times Ay \quad \text{[Equation 16]}$$

$$JF_{RR} = -NC_{Rr} \times Ay \quad \text{[Equation 17]}$$

When the lateral acceleration Ay is equal to or smaller than zero (Ay≤0), the jack-up/down forces JFFL, JFFR, JFRL, and JFRR are calculated from the following equations 18 to 21. In these equations, coefficients NCFl, PCFr, NCRl, and PCRr are proportional coefficients.

$$JF_{Fl} = NC_{Fl} \times Ay \quad \text{[Equation 18]}$$

$$JF_{FR} = -PC_{Fr} \times Ay \quad \text{[Equation 19]}$$

$$JF_{RL} = NC_{Rl} \times Ay \quad \text{[Equation 20]}$$

$$JF_{RR} = -PC_{Rr} \times Ay \quad \text{[Equation 21]}$$

On the other hand, the change in the load ΔWAx generated at each of the wheels due to the longitudinal acceleration Ax can be calculated from the following equation 22, assuming that ΔX21offset represents the relative displacement generated due to the longitudinal acceleration Ax, hg represents the height of the sprung center of gravity G, Lwbs represents the dimension of the wheelbase, Ax [m/s²] represents the longitudinal acceleration, θpitch [degrees] represents a pitch angle generated due to a pitch, and M [kg] represents the sprung mass as the vehicle weight as illustrated in FIG. 6. Assume that the generated pitch angle θpitch is a value approximately equal to zero (θpitch≈0) as indicated by the following equation 23 for the simplification of the calculation.

$$\Delta WAx = \frac{2Axhg(M_{Fr} + M_{Rr})\cos\theta_{pitch}}{2Lwbs} \quad \text{[Equation 22]}$$

$$\cos\theta_{pitch} \cong 1 \quad \text{[Equation 23]}$$

The relative acceleration ax generated due to the longitudinal acceleration Ax can be expressed as the following equation 24, and the change in the load ΔWAx generated at each of the wheels due to the longitudinal acceleration Ax can be expressed as the following equation 25.

$$\alpha x = \Delta \ddot{X}_{21_{offset}} \quad \text{[Equation 24]}$$

$$\Delta WAx = M \Delta \ddot{X}_{21_{offset}} \quad \text{[Equation 25]}$$

The lift-up/down force (i.e., the front-wheel anti-dive/squat forces GFFL, GFFR, GFRL, and GFRR) due to the suspension geometry is generated on the sprung portion of the vehicle body 1 side according to the dive/squat generated due to the longitudinal acceleration Ax. These forces GFFL, GFFR, GFRL, and GFRR are in a proportional relationship with the longitudinal acceleration Ax. Therefore, when the longitudinal acceleration Ax is positive (Ax>0), the front-wheel anti-dive/squat forces GFFL, GFFR, GFRL, and GFRR can be calculated from the following equations 26 to 29. In these equations, coefficients ACFl, ACFr, ACRl, and ACRr are proportional coefficients when the vehicle is accelerated.

$$GF_{FL} = -AC_{Fl} \times Ax \quad \text{[Equation 26]}$$

$$GF_{FR} = -AC_{Fr} \times Ax \quad \text{[Equation 27]}$$

$$GF_{RL} = AC_{Rl} \times Ax \quad \text{[Equation 28]}$$

$$GF_{RR} = AC_{Rr} \times Ax \quad \text{[Equation 29]}$$

When the longitudinal acceleration Ax is equal to or smaller than zero (Ax≤0), the front-wheel anti-dive/squat forces GFFL, GFFR, GFRL, and GFRR can be calculated from the following equations 30 to 33. In these equations, coefficients DCFl, DCFr, DCRl, and DCRr are proportional coefficients when the vehicle is decelerated.

$$GF_{FL} = DC_{Fl} \times Ax \quad \text{[Equation 30]}$$

$$GF_{FR} = DC_{Fr} \times Ax \quad \text{[Equation 31]}$$

$$GF_{RL} = -DC_{Rl} \times Ax \quad \text{[Equation 32]}$$

$$GF_{RR} = -DC_{Rr} \times Ax \quad \text{[Equation 33]}$$

The vertical relative acceleration calculation portion 20 illustrated in FIG. 4 calculates the net force Ma derived from the operation by summing up the jack-up/down force JFFL, JFFR, JFRL, or JFRR estimated by the front-wheel jack-up force estimation portion 17A from the above-described equations 14 to 21, the change in the load ΔW applied to each of the wheels 2 that is calculated by the load change calculation portion 17B from the above-described equations 7 to 13, the front-wheel anti-dive/squat force GFFL, GFFR, GFRL, or GFRR estimated by the front-wheel anti-dive/squat force estimation portion 17C from the above-described equations 26 to 33, the change in the load ΔWAx calculated by the load change calculation portion 17D, the damper damping force Fda estimated by the damper damping force estimation portion 18 from the above-described equations 26 to 33, and the front-wheel spring force (kΔX21offset) estimated by the front-wheel spring force estimation portion 19 as indicated by the equation 34, which will be described below, to add up the respective forces (ΔW, ΔWAx, JF, and GF). After that, the vertical relative acceleration calculation portion 20 calculates the relative acceleration α as indicated by the above-described equations 3 and 4 by dividing the net force Ma by the mass M.

$$\Delta W + \Delta WAx + JF + GF - k\Delta X_{21_{offset}} - c\Delta \dot{X}_{21_{offset}} = M\Delta \ddot{X}_{21_{offset}} \quad \text{[Equation 34]}$$

The suspension control apparatus according to the first embodiment is configured in the above-described manner, and a control operation thereof will be described next.

Figure 7:
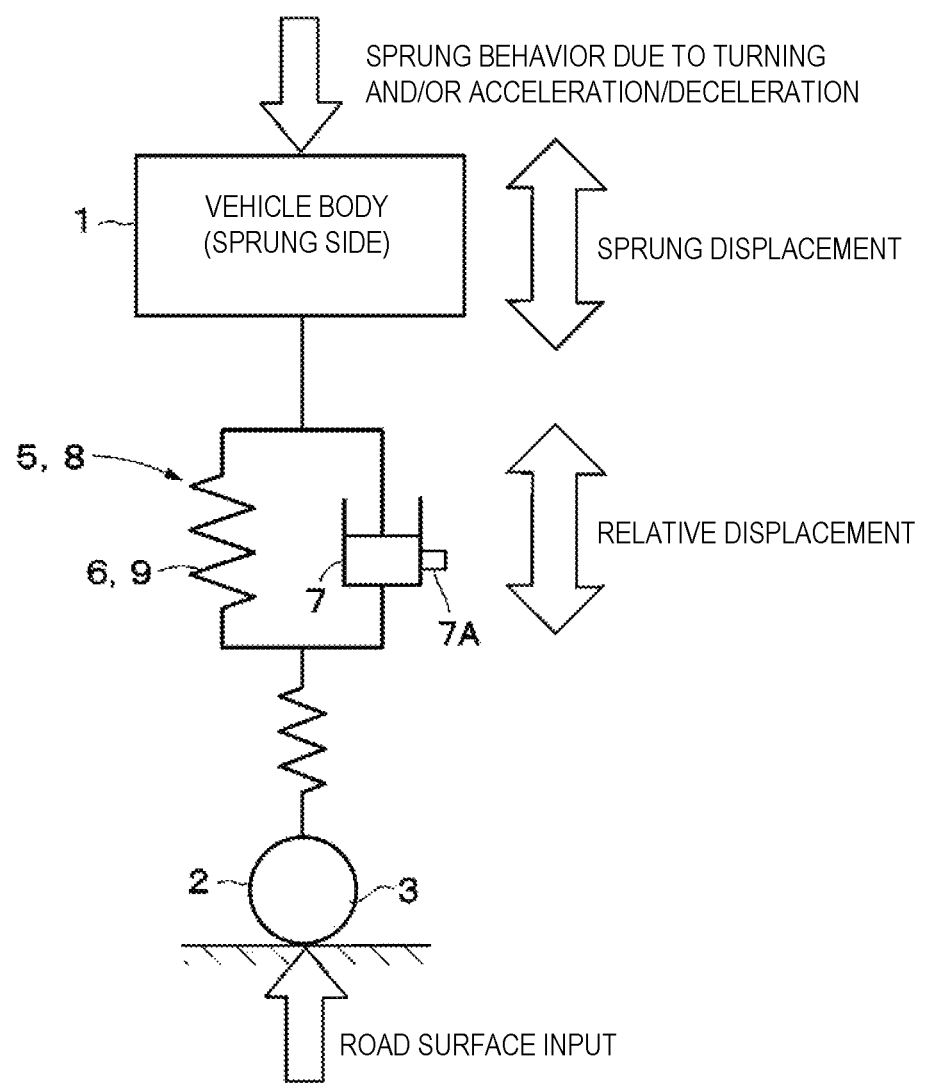
FIG. 7 is a schematic view illustrating an operation principle of a suspension apparatus.

The state estimation portion 13 of the controller 11 estimates the sprung state amount based on the vehicle height information from each of the vehicle height sensors 10 and the signal from the CAN 12. However, the sprung state amount in this case may be estimated with reduced accuracy unless the sprung displacement generated due to the driver's operation (the steering and/or the braking) and the relative displacement generated due to the road surface input are separated from each other as indicated in, for example, an operational principle diagram of the suspension apparatuses 5 and 8 illustrated in FIG. 7.

Therefore, in the first embodiment, the vertical relative acceleration calculation portion 20 of the state estimation portion 13 calculates the net force Ma of the operation-derived forces by summing up the jack-up/down force JFFL, JFFR, JFRL, or JFRR estimated by the front-wheel jack-up force estimation portion 17A, the change in the load ΔW applied to each of the wheels 2 that is calculated by the load change calculation portion 17B, the front-wheel anti-dive/squat force GFFL, GFFR, GFRL, or GFRR estimated by the front-wheel anti-dive squat force estimation portion 17C, the change in the load ΔWAx calculated by the load change calculation portion 17D, the damper damping force Fda estimated by the damper damping force estimation portion 18 from the above-described equation 2, and the front-wheel spring force (Fsp=kΔX21offset) estimated by the front-wheel spring force estimation portion 19 as indicated by the above-described equation 34. Then, the vertical relative acceleration calculation portion 20 calculates the relative acceleration α by dividing this net force Ma by the mass M.

Next, the relative speed calculation portion 21 estimates and calculates the relative speed (ΔX21offset/dt) as the sprung speed of the vehicle body 1 based on the relative acceleration α calculated by the relative acceleration calculation portion 20, and the relative displacement calculation portion 22 calculates the relative speed (ΔX21offset) by integrating the above-described relative speed (ΔX21offset/dt). In other words, the relative displacement calculation portion 22 calculates the relative displacement (ΔX21offset) generated from the inertial force derived from the driver's operation and the force generated due to the suspension geometry such as the jack-up/down force and the lift-up/down force as a vehicle inertial influence relative displacement.

After that, the vehicle behavior extraction portion 23 determines the external force derived from the road surface input by separating the above-described operation-derived force calculated by the above-described operation force calculation portion from the total external force calculated by the external force calculation portion 15. In other words, the vehicle behavior extraction portion 23 calculates the relative displacement due to the road surface disturbance (i.e., the road surface disturbance relative displacement) by subtracting the relative displacement (ΔX21offset) due to the driver's operation from the sensor value acquired by the vehicle height sensor 10.

In this manner, according to the first embodiment, the suspension control apparatus can calculate the relative displacement due to the road surface disturbance alone as the road surface disturbance relative displacement by separating the relative displacement due to the road surface input (the sensor value acquired by the vehicle height sensor 10) and the relative displacement derived from the driver's operation (ΔX21offset). As a result, the suspension control apparatus can improve the accuracy of estimating the sprung speed, which is highly contributive to the control of the ride comfort, thereby effectively controlling the ride comfort in correspondence with the road surface input.

More specifically, the relative displacement signal generated due to the road surface input (i.e., the road surface disturbance relative displacement) can be input to the calculation portion 14 illustrated in FIG. 3 by removing the relative displacement generated from the inertial force generated due to the driver's operation such as acceleration/deceleration and steering when the vehicle is running and the force generated due to the suspension geometry such as the jack-up/down force and the lift-up/down force from the sensor value measured by each of the vehicle height sensors 10.

After that, the calculation portion 14 estimates the above-described sprung speed based on the road surface disturbance relative displacement as a result of the estimation by the state estimation portion 13, determines the damping characteristic that the damper 7 should generate based on the estimated sprung speed, and outputs the instruction current i according to this damping characteristic to the actuator 7A, thereby being able to variably control the damping characteristic of the damper 7.

Figure 8:
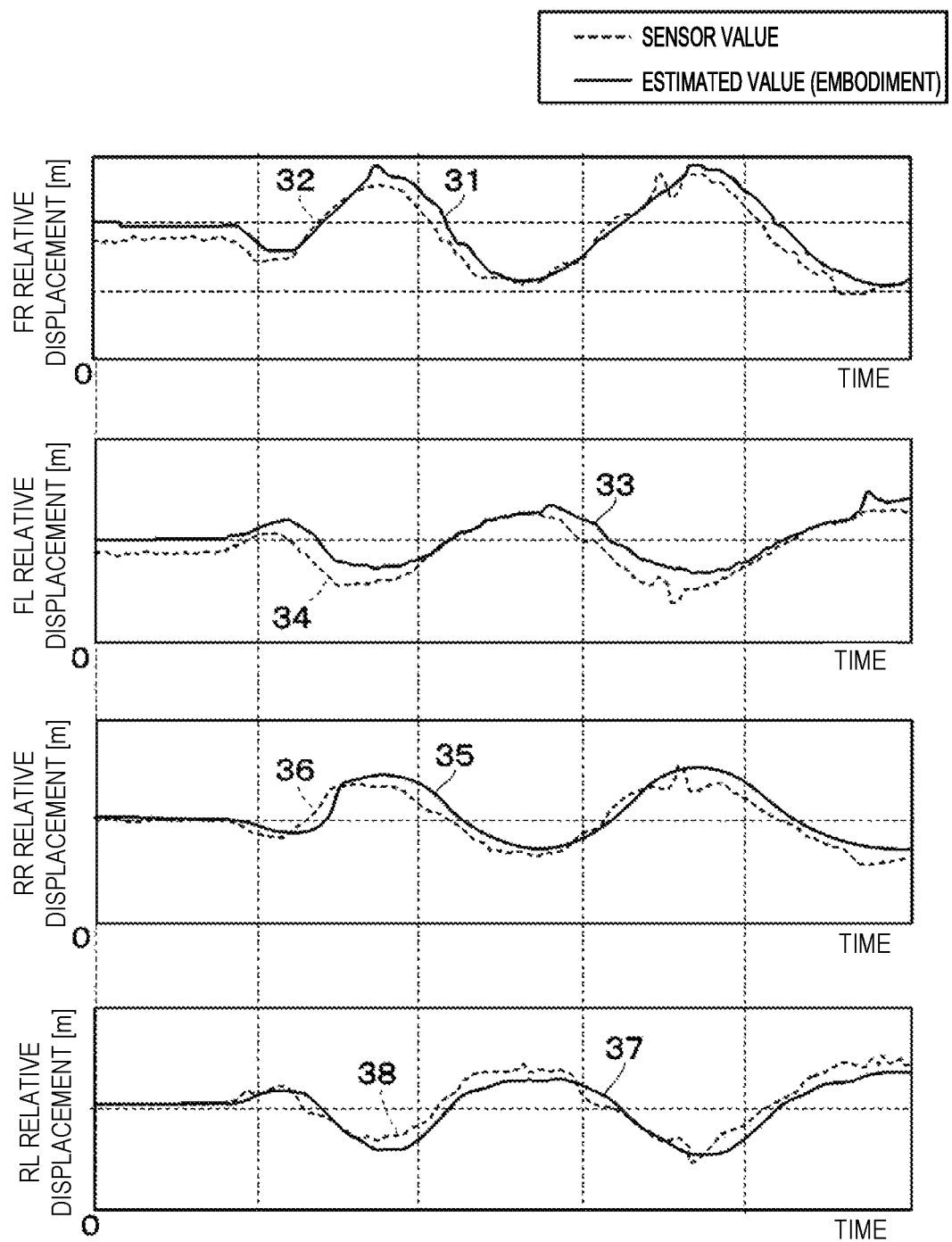
FIG. 8 is a characteristic line diagram illustrating a relative displacement at each of four wheels in a timing chart.
Figure 9:
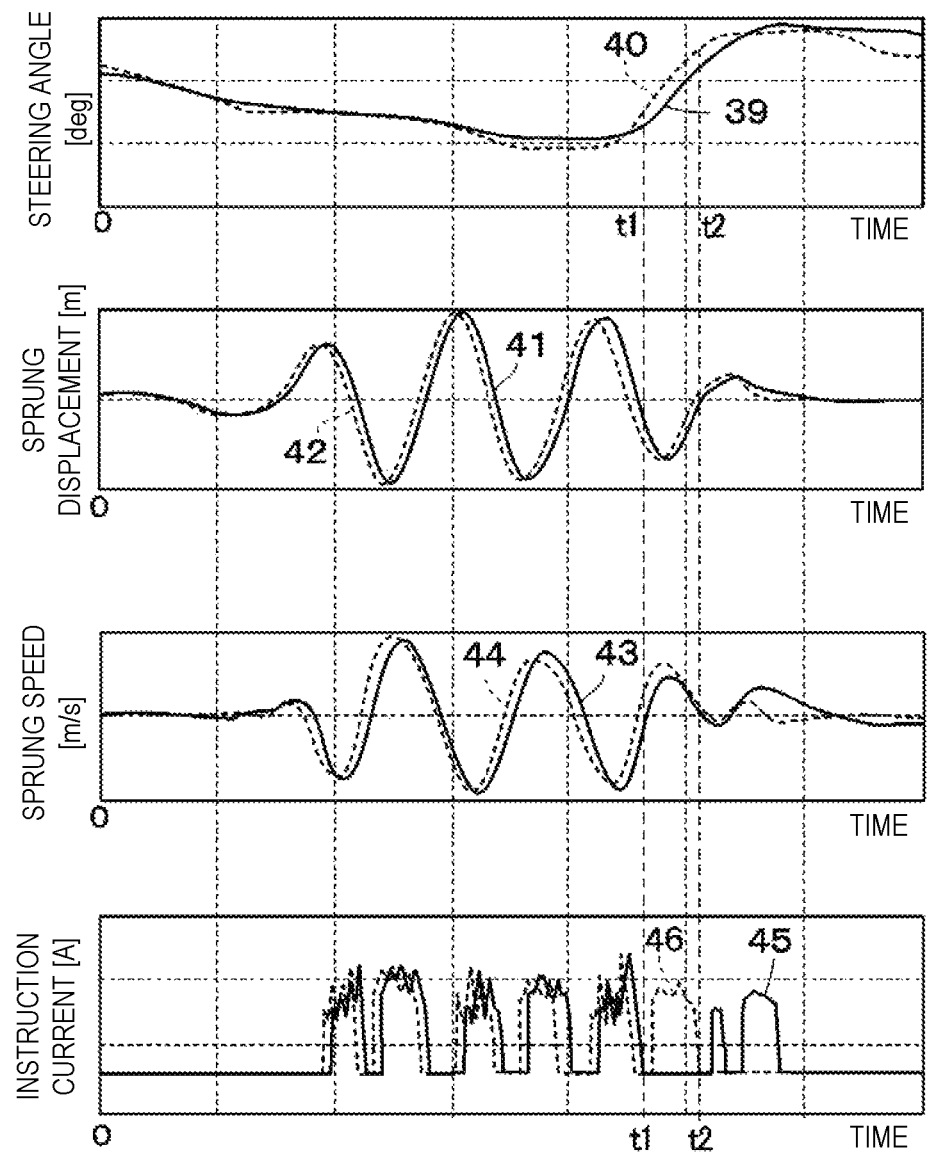
FIG. 9 is a characteristic line diagram illustrating characteristics of a steering angle, a sprung displacement, a sprung speed, and an instruction current of the automobile in a timing chart.
Figure 10:
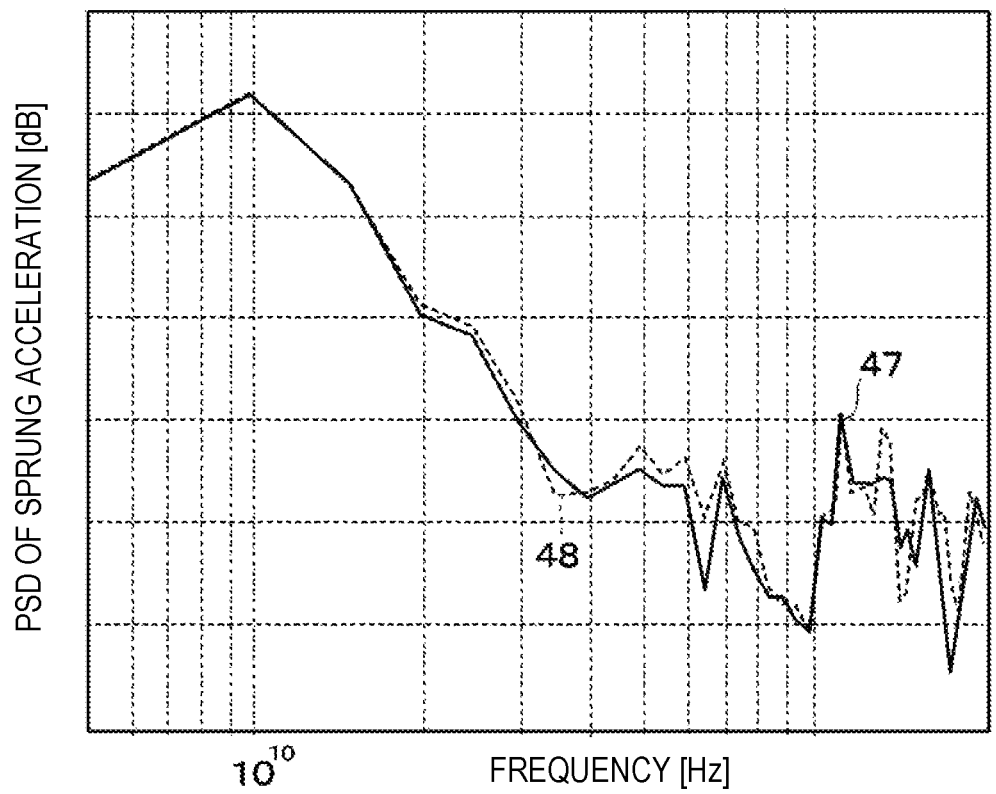
FIG. 10 is a characteristic line diagram illustrating a characteristic of a vertical acceleration on the sprung side of the automobile with respect to a vibration frequency.

Then, a running test was conducted by mounting the suspension control apparatus according to the present embodiment on an actual vehicle and driving this vehicle on a wavy road to verify the effectiveness of the vehicle state estimation according to the present embodiment. FIGS. 8 to 10 each illustrate the characteristic of the result of this test. In this case, the vehicle was driven in a running pattern of repeatedly entering and exiting the wavy road while turning, and a combined influence of the road surface input due to the wavy road and the behavior on the sprung side due to the steering was able to be evaluated.

A characteristic line 31 indicated by a solid line in FIG. 8 represents the characteristic of the relative displacement signal generated due to the road surface input (i.e., the road surface disturbance relative displacement) on the front right wheel 2FR side. On the other hand, a characteristic line 32 indicated by a dotted line represents the characteristic of the sensor value measured by the vehicle height sensor 10 on the front right wheel 2FR side. A characteristic line 33 indicated by a solid line in FIG. 8 represents the characteristic of the relative displacement signal generated due to the road surface input (i.e., the road surface disturbance relative displacement) on the front left wheel 2FL side. On the other hand, a characteristic line 34 indicated by a dotted line represents the characteristic of the sensor value measured by the vehicle height sensor 10 on the front left wheel 2FL side.

A characteristic line 35 indicated by a solid line in FIG. 8 represents the characteristic of the relative displacement signal generated due to the road surface input (i.e., the road surface disturbance relative displacement) on the rear right wheel 2RR side. On the other hand, a characteristic line 36 indicated by a dotted line represents the characteristic of the sensor value measured by the vehicle height sensor 10 on the rear right wheel 2RR side. Next, a characteristic line 37 indicated by a solid line in FIG. 8 represents the characteristic of the relative displacement signal generated due to the road surface input (i.e., the road surface disturbance relative displacement) on the rear left wheel 2RL side. On the other hand, a characteristic line 34 indicated by a dotted line represents the characteristic of the sensor value measured by the vehicle height sensor 10 on the rear left wheel 2RL side.

The characteristic lines 31, 33, 35, and 37 (the road surface disturbance relative displacement) according to the present embodiment indicated by the solid lines in FIG. 8 are confirmed to be characteristics of relatively smooth displacements compared to the characteristic lines 32, 34, 36, and 38 (the sensor values of the vehicle height sensors 10) indicated by the dotted lines, and allow the present embodiment to be evaluated to improve the ride comfort performance.

A characteristic line 39 indicated by a solid line in FIG. 9 represents the characteristic of the steering angle according to the present embodiment when the vehicle ran while turning on the wavy road. A characteristic line 40 indicated by a dotted line in FIG. 9 represents the change in the steering angle according to the conventional technique (i.e., when the relative displacement derived from the driver's operation and the relative displacement derived from the road surface input were not separated). Further, a characteristic line 41 indicated by a solid line represents the characteristic of the sprung displacement according to the present embodiment (i.e., when the relative displacement derived from the driver's operation and the relative displacement derived from the road surface input were separated). On the other hand, a characteristic line 42 indicated by a dotted line represents the characteristic of the sprung displacement according to the conventional technique.

A characteristic line 43 indicated by a solid line in FIG. 9 represents the characteristic of the sprung speed according to the present embodiment when the vehicle ran while turning on the wavy road. On the other hand, a characteristic line 44 indicated by a dotted line represents the characteristic of the sprung speed according to the conventional technique. Further, a characteristic line 45 indicated by a solid line represents the characteristic of the instruction current according to the present embodiment (i.e., when the relative displacement derived from the driver's operation and the relative displacement derived from the road surface input were separated). A characteristic line 46 indicated by a dotted line represents the characteristic of the instruction current according to the conventional technique.

The characteristic lines 40 to 46 illustrated in FIG. 9 make it clear that the instruction current was output as an incorrect instruction as understood from the characteristic line 46 according to the conventional technique indicated by the dotted line at a timing when the steering input and the input of the wavy road were fed in combination (for example, time t1 to time t2 in FIG. 9). For this reason, it is considered that the conventional technique led to the deterioration of the ride comfort as a whole due to this incorrect instruction. More specifically, it is considered that the conventional technique misinterpreted the sprung displacement generated due to the driver's input as the displacement derived from the road surface input, and performed erroneous control.

A characteristic line 47 indicated by a solid line in FIG. 10 represents a PSD value of the sprung acceleration according to the present embodiment as a relationship with a vibration frequency. A characteristic line 48 indicated by a dotted line in FIG. 10 represents a PSD value of the sprung acceleration according to the conventional technique (i.e., when the relative displacement derived from the driver's operation and the relative displacement derived from the road surface input were not separated). The characteristic line 47 (the PSD value of the sprung acceleration according to the present embodiment) also makes it clear that the ride comfort on the vehicle was improved as a whole compared to the conventional technique (the characteristic line 48).

In this manner, according to the first embodiment, the suspension control apparatus can improve the accuracy of the sprung estimation to thus improve the ride comfort performance by performing control of separating the relative displacement derived from the driver's operation and the relative displacement derived from the road surface input. In other words, because of the reduction in incorrect instructions like the example issued by the conventional technique, the suspension control apparatus can improve the ride comfort in a high-frequency region as understood from the characteristic line 47 indicated by the solid line in FIG. 10.

Therefore, according to the first embodiment, the suspension control apparatus becomes able to improve the accuracy of estimating the sprung speed for controlling the ride comfort due to the influence of the driver's acceleration/deceleration and steering on the sprung behavior, thereby becoming able to improve the ride comfort performance on the vehicle (the automobile) illustrated in, for example, FIGS. 1 and 2. Further, the suspension control apparatus can improve the accuracy of the estimated value of the relative displacement generated according to the type and specifications of the suspension by taking into consideration the jack-up/down force and the lift-up/down force generated due to the driver's operation that are derived from the suspension geometry.

Further, according to the first embodiment, the suspension control apparatus can reduce the incorrect control of the ride comfort control when the vehicle turns or is accelerated/decelerated to thus improve the ride comfort performance, by separating the relative displacement due to the driver's operation and the relative displacement due to the road surface input. In addition, the suspension control apparatus can realize a ride comfort performance equivalent to the conventional system using a sprung acceleration sensor despite using only the vehicle height sensor 10, thereby increasing the market value of the semi-active suspension system using the vehicle height sensor 10.

Figure 11:
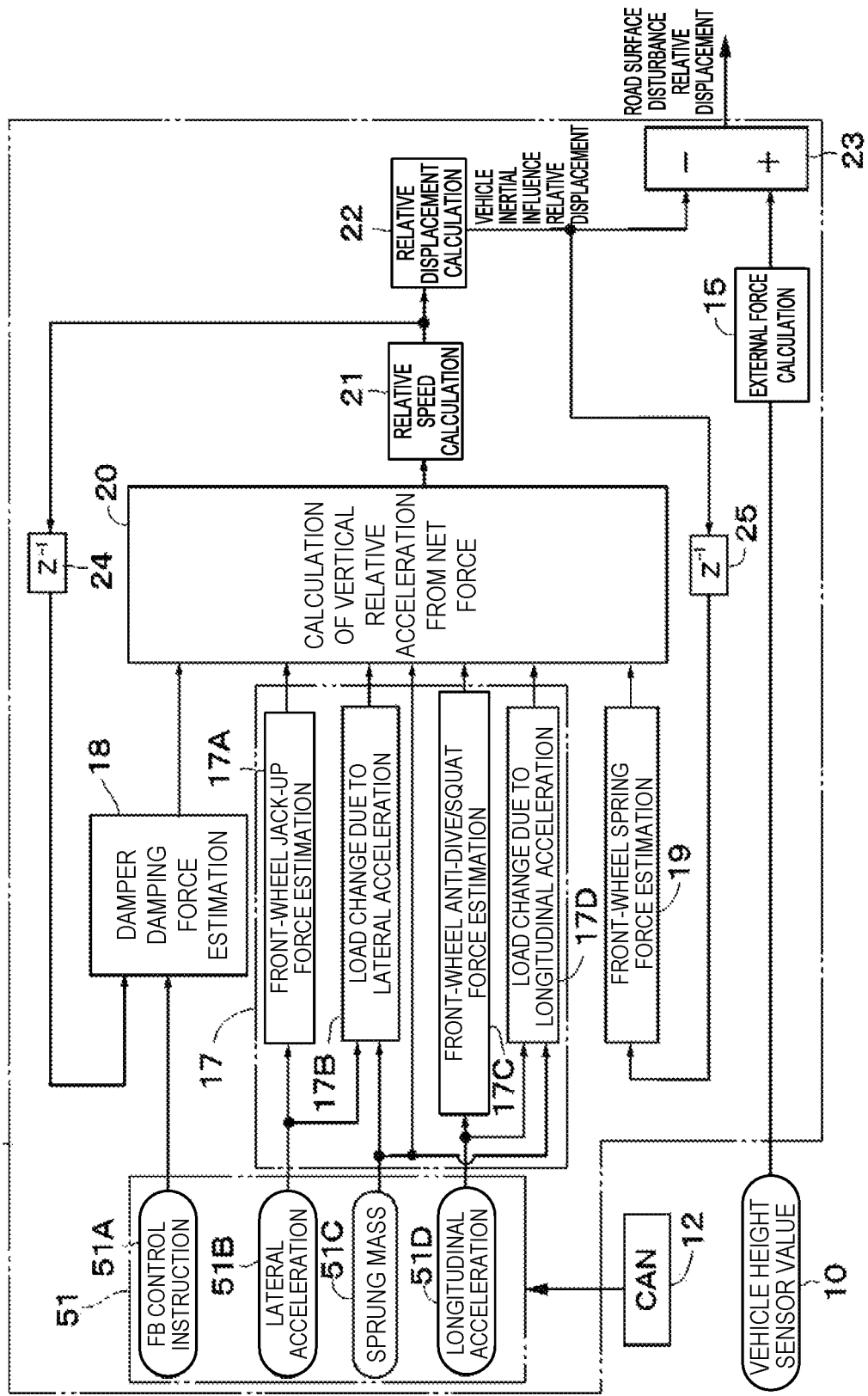
FIG. 11 is a control block diagram specifically illustrating a state estimation portion according to a second embodiment.

Next, FIG. 11 illustrates a second embodiment. The present embodiment is characterized by estimating the sprung mass based on the displacement calculated by the physical amount extraction portion (the vehicle height sensor) and the like, thereby improving the robustness of the accuracy of estimating the relative displacement value due to an increase/reduction in the sprung mass even when the number of passengers or the load weight on the vehicle is changed. The second embodiment will be described, assigning similar reference numerals to similar components to the above-described first embodiment and omitting descriptions thereof.

A signal processing portion 51 of the state estimation portion 13 according to the second embodiment includes an FB control instruction portion 51A, a lateral acceleration calculation portion 51B, a sprung mass calculation portion 51C, and a longitudinal acceleration calculation portion 51D, similarly to the signal processing portion 16 described in the above-described first embodiment. The FB control instruction portion 51A calculates the FB (feedback) control instruction based on the signal from the CAN 12. The lateral acceleration calculation portion 51B calculates the lateral acceleration Ay working on the vehicle based on the signal from the CAN 12 (for example, the steering angle signal and the vehicle speed signal of the vehicle).

However, the sprung mass calculation portion 51C of the signal processing portion 51 has a function of estimating and calculating the mass of the vehicle body 1 (the sprung mass M) based on a signal from the CAN 12 (for example, a signal including the sensor value of each of the vehicle height sensors 10). The sprung mass calculation portion 51C in this case can improve the robustness of the accuracy of estimating the relative displacement value due to the increase/reduction in the sprung mass M by using a mass value estimated from a mass estimation logic employing the vehicle height sensor 10.

In this manner, according to the thus-configured second embodiment, the portion 17B for calculating the load change due to the lateral acceleration Ay can use the mass value estimated from the mass estimation logic employing the vehicle height sensor 10 in which the mass M is set as a variable, when calculating the change in the load ΔW applied to each of the wheels 2 (i.e., the wheel loads ΔWFL, ΔWFR, ΔWRL, and ΔWRR) from the above-described equations 3 to 7 based on the sprung mass M calculated by the sprung mass calculation portion 51C and the lateral acceleration Ay.

Further, the portion 17D for calculating the load change due to the longitudinal acceleration Ax can also use the mass value estimated from the mass estimation logic employing the vehicle height sensor 10 in which the mass M is set as a variable, when calculating the change in the load ΔWAx generated at each of the wheels 2 from the above-described equations 18 to 19 based on the sprung mass M calculated by the sprung mass calculation portion 51C and the longitudinal acceleration Ax.

Further, the vertical relative acceleration calculation portion 20 (the acceleration calculation portion) can calculate the relative acceleration α as indicated by the above-described equations 3 and 4 with use of the vertical force (the operation-derived force) calculated by the vertical force calculation portion 17 and the like and the sprung mass M calculated by the sprung mass calculation portion 51C (the mass calculation portion).

Therefore, the suspension control apparatus can calculate the division using the mass value estimated from the mass estimation logic employing the vehicle height sensor 10 when acquiring the offset amount of the relative displacement based on the lateral acceleration and the longitudinal acceleration due to the driver's steering according to the above-described equations 13 and 25, thereby becoming able to improve the robustness of the accuracy of estimating the relative displacement value due to the increase/reduction in the sprung mass M.

Therefore, according to the second embodiment, even when the number of passengers or the load weight is changed, the suspension control apparatus can calculate the acceleration using the sprung mass estimated based on the displacement calculated by the physical amount calculation portion (for example, the vehicle height sensor 10) and the like, thereby being able to directly take into consideration the influence due to the change in the sprung mass M. As a result, the suspension control apparatus can improve the estimation accuracy when the weight is changed, thereby being able to improve the ride comfort on the vehicle.

Figure 12:
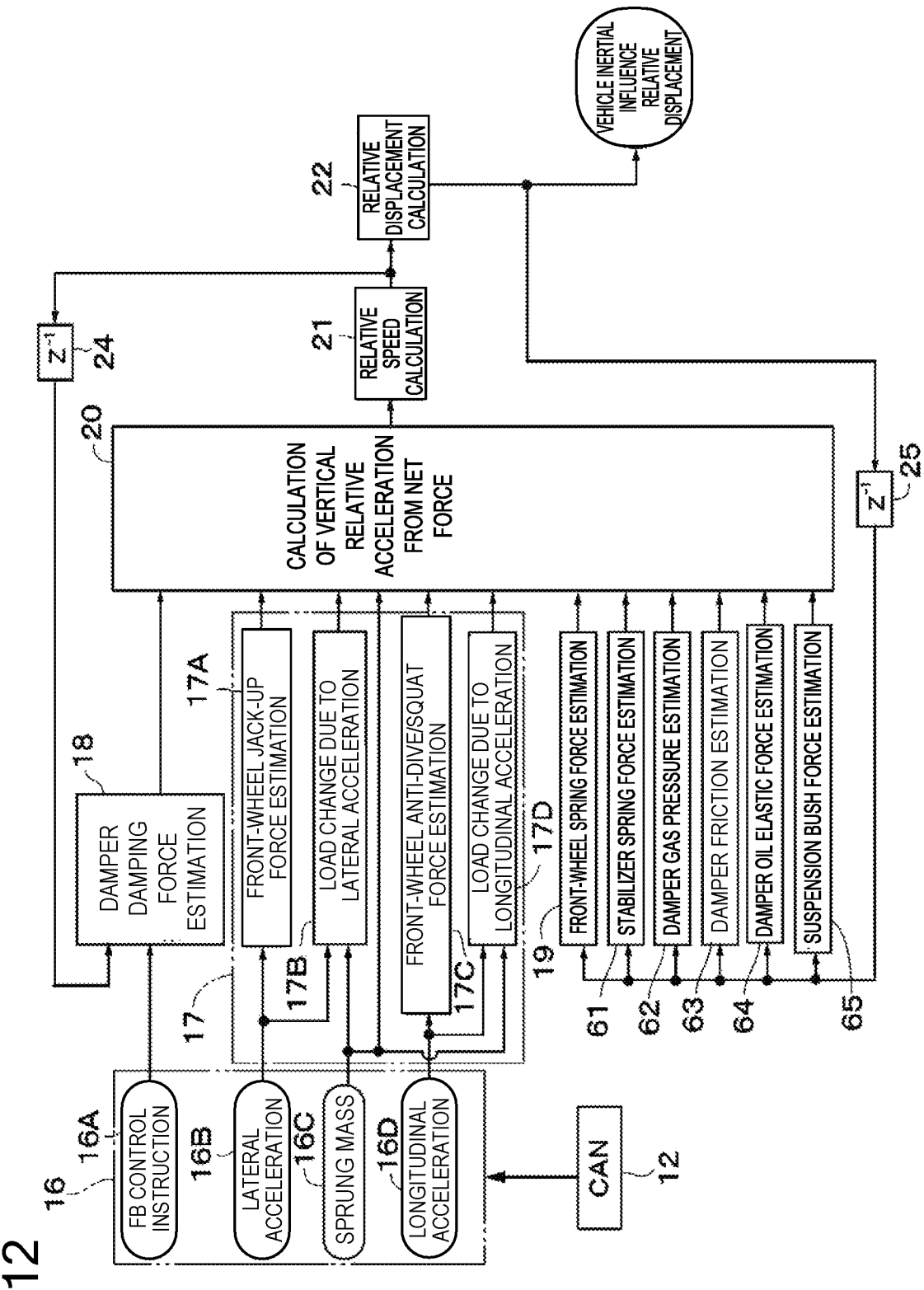
FIG. 12 is a control block diagram specifically illustrating a part of a state estimation portion according to a third embodiment.

Next, FIG. 12 illustrates a third embodiment. The present embodiment is characterized by being configured to also take into consideration, for example, a gas reaction force (KGas), a friction (KFriction), a hydraulic pressure (KOil), and a damping force response (Tdelay), which are forces generated by the damper, in addition to the above-described jack-up/down force (JF) and lift-up/down force (GF) as the inertial force derived from the driver's operation and the force generated due to the suspension geometry. The third embodiment will be described, assigning similar reference numerals to similar components to the above-described first embodiment and omitting descriptions thereof.

The vertical calculation portion 17 (i.e., the front-wheel jack-up force estimation portion 17A, the load change calculation portion 17B, the front-wheel anti-dive/squat force estimation portion 17C, and the load change calculation portion 17D), the damper damping force estimation portion 18, and the front-wheel spring force estimation portion 19 are connected to the input side of the vertical relative acceleration calculation portion 20. However, in the third embodiment, a stabilizer spring force estimation portion 61, a damper gas pressure estimation portion 62, a damper friction estimation portion 63, a damper oil elastic force estimation portion 64, and a suspension bush force estimation portion 65 are further connected to the input side of the vertical relative acceleration calculation portion 20.

The stabilizer spring force estimation portion 61 estimates and calculates the stabilizer reaction force due to the torsional stiffness of the stabilizer 4F on the front wheel side illustrated in FIG. 2 based on the roll or the difference in vertical motion between the front left wheel 2FL and the front right wheel 2FR. Further, regarding the stabilizer 4R on the rear wheel side illustrated in FIG. 2, the stabilizer spring force estimation portion 61 also similarly estimates and calculates the stabilizer reaction force due to the torsional stiffness based on the roll or the difference in vertical motion between the rear left wheel 2RL and the rear right wheel 2RR.

The damper gas pressure estimation portion 62 is configured to use air springs (not illustrated) of air suspensions instead of the coil springs 6 and 9 illustrated in FIGS. 1 and 2 on the suspension apparatuses 5 and 8 on the front and rear wheel sides, and estimates and calculates the gas reaction force (KGas) of the hydraulic fluid (compressed air) supplied to or discharged from each of the air springs on the front left wheel 2FL, front right wheel 2FR, rear left wheel 2RL, and rear right wheel 2RR sides as a damper gas pressure.

The damper friction estimation portion 63 estimates and calculates frictional resistance at a sliding portion of each of the dampers 7 as the friction (KFriction). The damper oil elastic force estimation portion 64 estimates and calculates the hydraulic pressure (KOil) of the hydraulic fluid (oil) sealingly contained in each of the dampers 7 as a damper oil elastic force. The suspension bush force estimation portion 65 functions to estimate and calculate a bush and a mount provided on each of the dampers 7 as a component of the suspension as an equivalent spring constant (KBushing).

Further, the damping force response (Tdelay) at each of the suspension apparatuses 5 and 8 on the front and rear wheel sides can also be used as an element for improving the estimation accuracy. Further, the stabilizer reaction force exerted by each of the stabilizers 4F and 4R on the front and rear wheel sides can also be added to the following equation 35.

The following equation 35 indicates an equation of motion of the suspension apparatus according to the third embodiment. In this equation, a damping force Fd is calculated based on the damping fore delay (Tdelay) from the following equation 36, and a damping force Fc is calculated based on the damping coefficient c from the following equation 37.

$$m\ddot{X}_{21} = -k_{Gas}X_{21} - k_{Friction}X_{21} - k_{oil}X_{21} - k_{Bushing}X_{21} - Fd \quad \text{[Equation 35]}$$

$$Fd = \frac{1}{1+T_{delay} \times S} \times Fc \quad \text{[Equation 36]}$$

$$Fc = c\dot{X}_{21} \quad \text{[Equation 37]}$$

In this manner, in the thus-configured third embodiment, the suspension control apparatus is configured in such a manner that the stabilizer spring force estimation portion 61, the damper gas pressure estimation portion 62, the damper friction estimation portion 63, the damper oil elastic force estimation portion 64, the suspension bush force estimation portion 65, and the like are additionally connected to the input side of the vertical relative acceleration calculation portion 20 besides the front-wheel spring force estimation portion 19 and the like. Therefore, the suspension control apparatus can improve the accuracy of calculating (estimating) the net force Ma before it is divided by the mass M at the vertical relative acceleration calculation portion 20 illustrated in FIG. 12, by additionally adding each of the items written on the right side of the above-described equation 35 to, for example, the left side of the above-described equation 34.

Figure 13:
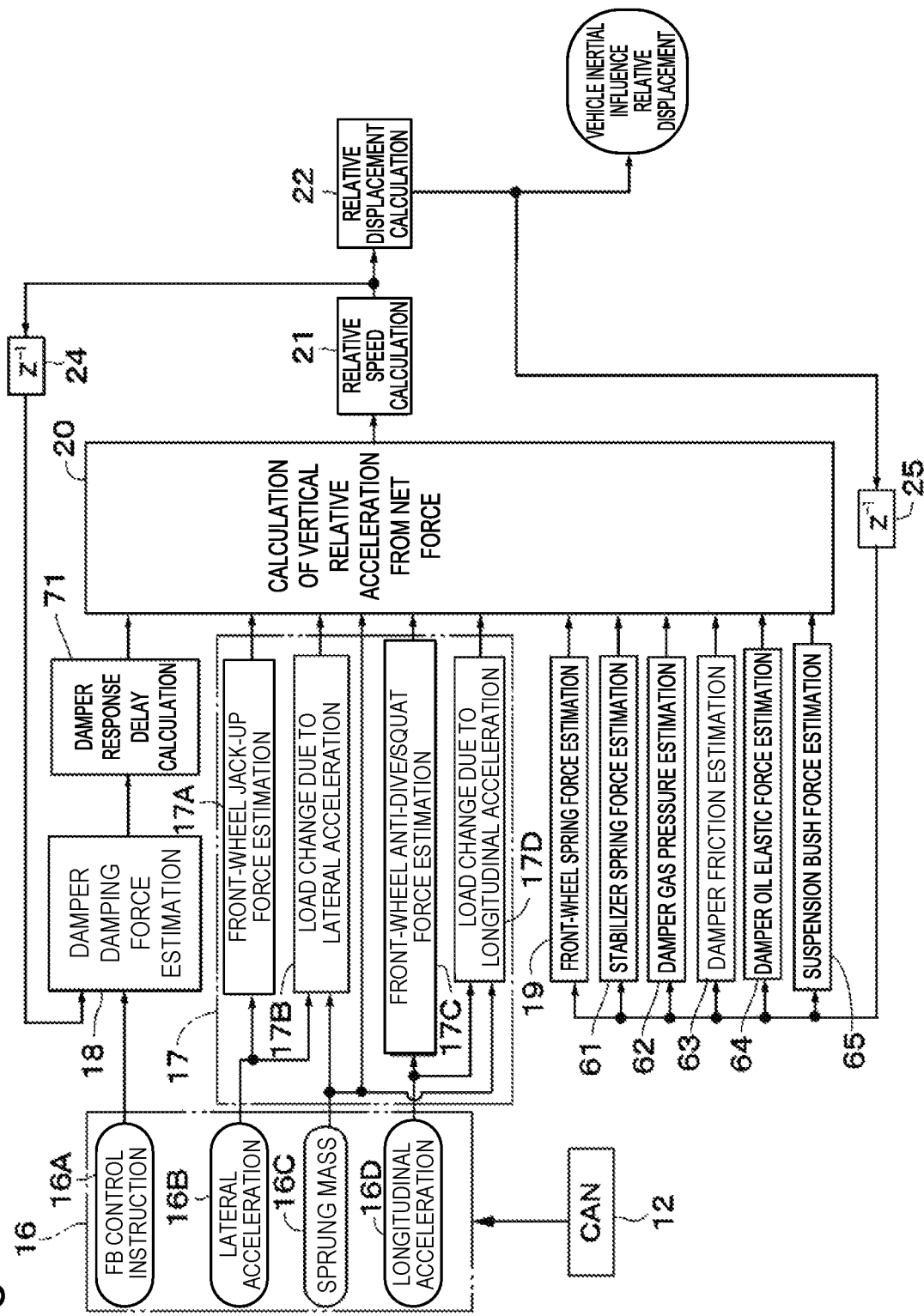
FIG. 13 is a control block diagram specifically illustrating a part of a state estimation portion according to a fourth embodiment.
Figure 14:
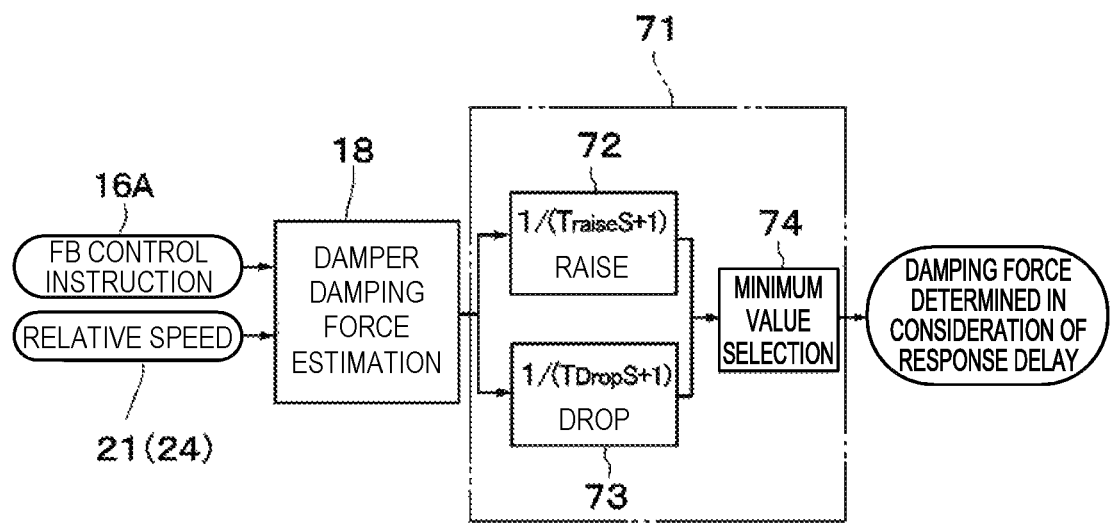
FIG. 14 is a control block diagram specifically illustrating a damper response delay calculation portion illustrated in FIG. 13.
Figure 15:
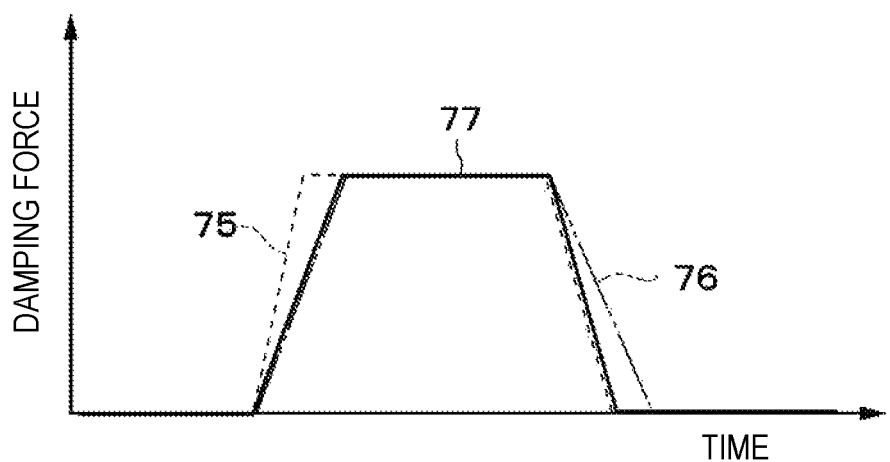
FIG. 15 is a control block diagram illustrating a characteristic of a damping force determined in consideration of a response delay according to the fourth embodiment.

Next, FIGS. 13 to 15 illustrate a fourth embodiment. The present embodiment will be described, assigning similar reference numerals to similar components to the above-described third embodiment and omitting descriptions thereof. However, the fourth embodiment is characterized by being configured to include a damper response delay calculation portion 71 between the damper damping force estimation portion 18 and the vertical relative acceleration calculation portion 20.

Then, the damper response delay calculation portion 71 includes a raise-side (rise-side) primary delay element 72 and a drop-side (fall-side) primary delay element 73, and a minimum value selection portion 74 as illustrated in FIG. 14. The minimum value selection portion 74 selects a smaller damper damping force from a damper damping force calculated and output via the raise-side primary delay element 72 (a characteristic line 75 indicated by a dotted line in FIG. 15) and a damper damping force calculated and output via the drop-side primary delay element 73 (a characteristic line 76 indicated by an alternate long and two short dashes line in FIG. 15).

Due to this configuration, the damping force determined in consideration of the damper response delay like a characteristic line 77 indicated by a solid line in FIG. 15 can be output from the minimum value selection portion 74 of the damper response delay calculation portion 71 to the vertical relative acceleration calculation portion 20. The FB (feedback) control instruction calculated by the FB control instruction portion 16A based on the signal from the CAN 12 and the signal of the relative speed output from the relative speed calculation portion 21 via the delay operator 24 are input to the damper damping force estimation portion 18.

The damping force Fd in the above-described equation 35 has a response characteristic dependent on the mechanism of each of the dampers 7, and the response characteristic of each of the dampers 7 includes a characteristic derived from extension (extension stroke) and compression (compression stroke) relative speeds and a characteristic derived from the instruction current. Taking them into consideration as indicated by the above-described equation 36 allows the suspension control apparatus to improve the estimation accuracy. For example, the damper response delay calculation portion 71 illustrated in FIG. 14 is formed by combining the primary delay elements 72 and 73.

In this manner, in the thus-configured fourth embodiment, the suspension control apparatus can estimate and calculate the damping force in consideration of the response delay like the characteristic line 77 indicated by the solid line in FIG. 15 and output the damping force Fd as a result of this calculation to the vertical relative acceleration calculation portion 20. Therefore, the suspension control apparatus can improve the accuracy of estimating the relative displacement offset derived from the driver's operation.

Figure 16:
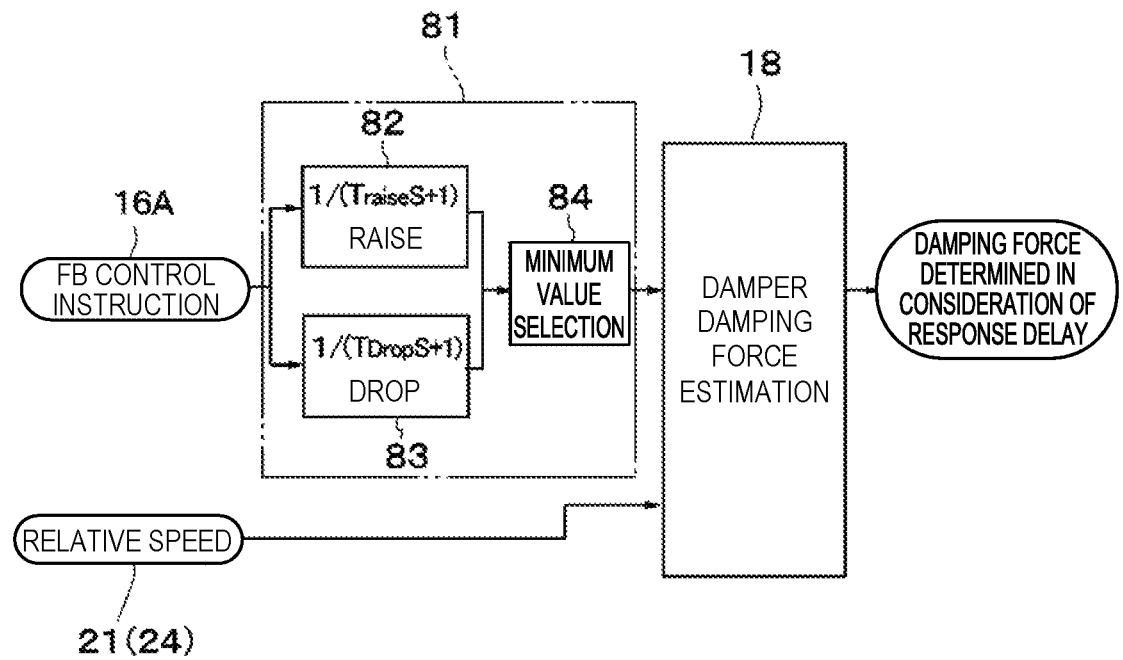
FIG. 16 is a control block diagram illustrating a control instruction response delay calculation portion according to a fifth embodiment.
Figure 17:
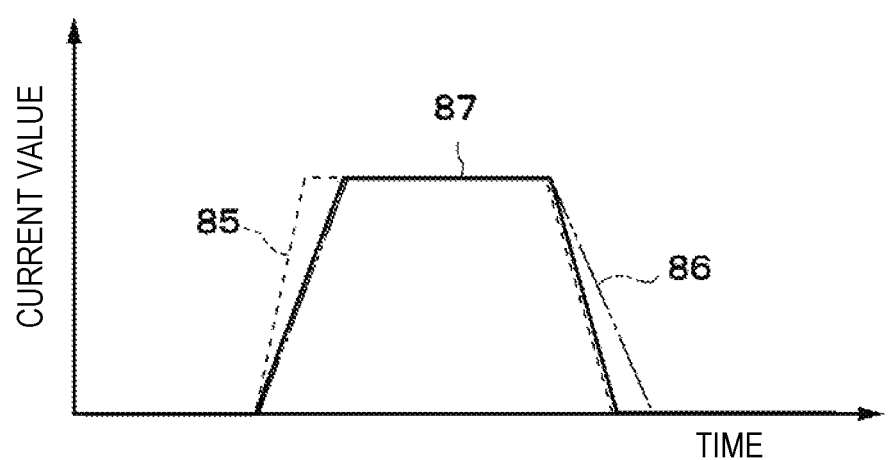
FIG. 17 is a characteristic line diagram illustrating a characteristic of a current value determined in consideration of a delay in a response to the control instruction according to the fifth embodiment.

Next, FIGS. 16 and 17 illustrate a fifth embodiment. The present embodiment will be described, assigning similar reference numerals to similar components to the above-described third embodiment and omitting descriptions thereof. However, the fifth embodiment is characterized by being configured to include a control instruction response delay calculation portion 81 between the FB control instruction portion 16A and the damper damping force estimation portion 18.

Then, the control instruction response delay calculation portion 81 includes a raise-side primary delay element 82 and a drop-side primary delay element 83, and a minimum value selection portion 84 as illustrated in FIG. 16. The minimum value selection portion 84 selects a smaller current value from a current value of the control instruction output from the FB control instruction portion 16A via the raise-side primary delay element 82 (a characteristic line 85 indicated by a dotted line in FIG. 17) and a current value of the control instruction output from the FB control instruction portion 16A via the drop-side primary delay element 83 (a characteristic line 86 indicated by an alternate long and two short dashes line in FIG. 17).

Due to this configuration, the current value of the control instruction determined in consideration of the response delay like a characteristic line 87 indicated by a solid line in FIG. 17 can be output from the minimum value selection portion 84 of the control instruction response delay calculation portion 81 to the damper damping force estimation portion 18. The control instruction determined in consideration of the response delay that is output from the control instruction response delay calculation portion 81 (the minimum value selection portion 84) and the signal of the relative speed output from the relative speed calculation portion 21 via the delay operator 24 are input to the damper damping force estimation portion 18.

The instruction current (the current value of the control instruction) calculated based on the target damping force calculated by the controller 11 and the current actually flowing in the circuit affect the raise and drop of the instruction current due to increases in the temperature of the solenoid and the temperature of the transistor. The control instruction response delay calculation portion 81 combines the primary delay elements 82 and 83 as illustrated in FIG. 16, thereby taking the raise and drop of the current into consideration as the response characteristic of the instruction current value is illustrated in FIG. 17, thus being able to correctly estimate the actually generated damping force and improving the accuracy of estimating the relative displacement offset derived from the driver's operation.

In this manner, in the thus-configured fifth embodiment, the suspension control apparatus can estimate and calculate the current value of the control instruction in consideration of the response delay like the characteristic line 87 indicated by the solid line in FIG. 17 and output the current value as a result of this calculation to the damper damping force estimation portion 18. Therefore, the suspension control apparatus can improve the accuracy of estimating the relative displacement offset derived from the driver's operation.

Each of the above-described embodiments has been described based on the example in which the vehicle height sensor 10 provided on each of the wheels is used to form the physical amount extraction portion that detects and estimates the physical amount based on the relative displacement between the vehicle body 1 and each of the wheels 2 (i.e., the vertical force and/or the vertical position). However, the present invention is not limited thereto, and, for example, a load sensor on each of the wheel sides may be used to form the physical amount extraction portion. However, for example, an acceleration sensor that generally acquires the relative displacement shall not be included in the physical amount extraction portion.

Further, in each of the above-described embodiments, the state estimation portion 13 is assumed to estimate the state of the vehicle body with use of the vehicle model incorporating the stabilizer therein. However, the present invention is not limited thereto, and the state of the vehicle body may be estimated with use of a vehicle model with the stabilizer removed therefrom.

Further, each of the above-described embodiments has been described based on the example in which the damping force adjustable shock absorber is constructed with use of the damping force adjustable damper 7 embodied by the semi-active damper. However, the present invention is not limited thereto, and may be configured in such a manner that the damping force adjustable shock absorber is constructed with use of, for example, an active damper (any of an electric actuator and a hydraulic actuator).

Possible configurations as the suspension control apparatus based on the above-described embodiments include the following examples.

As a first configuration, a suspension control apparatus includes damping force adjustable shock absorbers disposed between a vehicle body and individual wheels of a vehicle, respectively, and each having a damping characteristic that changes according to an instruction from an outside, a physical amount extraction portion configured to detect or estimate a physical amount based on a relative displacement between the vehicle body and each of the wheels, and a control device configured to control the damping characteristic of each of the damping force adjustable shock absorbers. The control device includes an external force calculation portion configured to calculate a total external force working on the vehicle body based on the physical amount output from the physical amount extraction portion, an operation force calculation portion configured to calculate an operation-derived force applied to each of the damping force adjustable shock absorbers according to a load movement due to an operation on the vehicle, and a vehicle behavior extraction portion configured to determine an external force derived from a road surface input by separating the operation-derived force calculated by the operation force calculation portion from the total external force calculated by the external force calculation portion.

As a second configuration, in the above-described first configuration, the operation-derived force includes an inertial force generated due to acceleration/deceleration and steering of the vehicle or a force generated due to a suspension geometry. As a third configuration, in the above-described first configuration, the physical amount extraction portion includes a vehicle height sensor.

As a fourth configuration, in the above-described first configuration, the control device includes a vertical force calculation portion configured to calculate a vertical force on the vehicle body, an acceleration calculation portion configured to calculate an acceleration based on the vertical force calculated by the vertical force calculation portion, a sprung speed estimation portion configured to estimate a sprung speed of the vehicle body based on the acceleration calculated by the acceleration calculation portion, and a damping characteristic determination portion configured to determine the damping characteristic of each of the damping force adjustable shock absorbers based on the sprung speed estimated by the sprung speed estimation portion. As a fifth configuration, the above-described fourth configuration further includes a mass calculation portion configured to calculate a mass of the vehicle body based on a displacement calculated by the physical amount extraction portion. The acceleration calculation portion calculates the acceleration with use of the vertical force calculated by the vertical force calculation portion and the mass calculated by the mass calculation portion.

According to this fifth configuration, the suspension control apparatus can calculate the acceleration by dividing the vertical force calculated by the vertical force calculation portion by the mass calculated by the mass calculation portion. Therefore, even when the number of passengers or the load weight is changed, the suspension control apparatus can calculate the acceleration using the sprung mass estimated based on the displacement calculated by the physical amount calculation portion (a vehicle height sensor) and the like, thereby being able to directly take into consideration the influence due to a change in the sprung mass. As a result, the suspension control apparatus can improve the estimation accuracy when the weight is changed, thereby being able to improve the ride comfort on the vehicle.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2018-060017 filed on Mar. 27, 2018. The entire disclosure of Japanese Patent Application No. 2018-060017 filed on Mar. 27, 2018 including the specification, the claims, the drawings, and the abstract is incorporated herein by reference in its entirety.

REFERENCE SIGN LIST

1 vehicle body
2 wheel
4 stabilizer (stabilizer mechanism)
5, 8 suspension apparatus
7 damping force adjustable damper (damping force adjustable shock absorber)

10 vehicle height sensor (physical amount extraction portion)
11 controller (control device)
13 state estimation portion
14 calculation portion
15 external force calculation portion (external force calculation portion)
16 signal processing portion
17 vertical force calculation portion (vertical force calculation portion and operation force calculation portion)
18 damper damping force estimation portion (damping characteristic determination portion and operation force calculation portion)
19 front-wheel spring force estimation portion (operation force calculation portion)
20 vertical relative acceleration calculation portion (acceleration calculation portion)
21 relative speed calculation portion (sprung speed estimation portion)
22 relative displacement calculation portion
23 vehicle behavior extraction portion (vehicle behavior extraction portion)
51C sprung mass calculation portion (mass calculation portion)

The invention claimed is:

1. A suspension control apparatus comprising:
damping force adjustable shock absorbers disposed between a vehicle body and individual wheels of a vehicle, respectively, the damping force adjustable shock absorbers each having a damping characteristic that changes according to an instruction from a control input from a driver;
a physical amount extraction portion configured to detect or estimate a physical amount based on a relative displacement between the vehicle body and each of the wheels; and
a control device configured to control the damping characteristic of each of the damping force adjustable shock absorbers,
wherein the control device includes
an external force calculation portion configured to calculate a total external force working on the vehicle body based on the physical amount output from the physical amount extraction portion,
an vertical force calculation portion configured to calculate a vertical force applied to each of the damping force adjustable shock absorbers according to a load movement due to an operation on the vehicle,
wherein the vertical force calculation portion comprises a front-wheel jack-up force estimation portion for estimating the jack-up/down force, a portion for calculating the load change due to the lateral acceleration, a front-wheel anti-dive/squat force estimation portion for estimating the front-wheel anti-dive/squat force, and a portion for calculating the load change due to the longitudinal acceleration, wherein the vertical force is calculated by summing up the jack-up/down force, the change in the load due to the lateral acceleration, the front-wheel anti-dive/squat force, and the change in the load due to the longitudinal acceleration, and
a vehicle behavior extraction portion configured to determine an external force derived from a road surface disturbance by subtracting the vertical force calculated by the vertical force calculation portion from the total external force calculated by the external force calculation portion.

2. The suspension control apparatus according to claim 1, wherein the vertical force includes an inertial force generated due to an acceleration/deceleration and a steering of the vehicle or the vertical force includes an inertial force generated due to an acceleration/deceleration and a force generated due to a suspension geometry.

3. The suspension control apparatus according to claim 1, wherein the physical amount extraction portion includes a vehicle height sensor.

4. The suspension control apparatus according to claim 1, wherein the control device includes
a mass calculation portion configured to calculate a mass of the vehicle body based on a displacement calculated by the physical amount extraction portion,
an acceleration calculation portion configured to calculate an acceleration based on the vertical force calculated by the vertical force calculation portion and the mass calculated by the mass calculation portion,
a sprung speed estimation portion configured to estimate a sprung speed of the vehicle body from the acceleration calculated by the acceleration calculation portion, and
a damping characteristic determination portion configured to determine the damping characteristic of each of the damping force adjustable shock absorbers based on the sprung speed estimated by the sprung speed estimation portion.

* * * * *